United States Patent
Kim et al.

(10) Patent No.: US 9,781,646 B2
(45) Date of Patent: *Oct. 3, 2017

(54) METHOD AND APPARATUS FOR CONTROLLING RE-DIRECTION BETWEEN HETEROGENEOUS MOBILE COMMUNICATION SYSTEMS

(71) Applicant: Samsung Electronics Co., Ltd., Gyeonggi-do (KR)

(72) Inventors: Sang-Bum Kim, Gyeonggi-do (KR); Gert-Jan Van Lieshout, Middlesex (GB); Kyeong-In Jeong, Gyeonggi-do (KR); Song-Yean Cho, Seoul (KR); Han-Na Lim, Seoul (KR); Sang-Soo Jeong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,071

(22) Filed: Oct. 8, 2015

(65) Prior Publication Data

US 2016/0112916 A1    Apr. 21, 2016

Related U.S. Application Data

(63) Continuation of application No. 14/407,448, filed as application No. PCT/KR2013/005142 on Jun. 11, 2013, now Pat. No. 9,622,129.

(Continued)

(30) Foreign Application Priority Data

Jul. 4, 2012  (KR) ........................ 10-2012-0073097
Sep. 28, 2012  (KR) ........................ 10-2012-0109407

(51) Int. Cl.
H04W 36/00 (2009.01)
H04W 36/14 (2009.01)
(Continued)

(52) U.S. Cl.
CPC ............. *H04W 36/14* (2013.01); *H04W 8/02* (2013.01); *H04W 64/00* (2013.01); *H04W 76/027* (2013.01); *H04W 84/042* (2013.01)

(58) Field of Classification Search
CPC ... H04W 36/14; H04W 76/02; H04W 76/027; H04W 8/02
(Continued)

(56) References Cited

U.S. PATENT DOCUMENTS 7,123,910 B2   10/2006   Lucidarme et al.
8,599,791 B2   12/2013   Mukherjee et al.
(Continued)

FOREIGN PATENT DOCUMENTS

KR   10-2009-0109348   10/2009
KR   10-2012-0006659   1/2012
(Continued)

OTHER PUBLICATIONS

Partial Supplementary Search Report dated Jan. 28, 2016 in connection with European Application No. 13803854.2, 10 pages.
(Continued)

*Primary Examiner* — Juan A Torres

(57) ABSTRACT

The present invention is a method for controlling re-direction between heterogeneous mobile communication systems, comprising a step in which a terminal, a connection request of which is rejected from a first communication system (UTRAN), receives, from a second communication system to which the terminal intends to connect, information indicating that the second communication system does not support the terminal; a step of setting information for (Continued)

preventing re-direction to the second communication system; and a step of transmitting, to the first communication system, a request for connection to the first communication system, which includes the information.

10 Claims, 21 Drawing Sheets

Related U.S. Application Data

(60) Provisional application No. 61/658,141, filed on Jun. 11, 2012.

(51) Int. Cl.
*H04W 8/02* (2009.01)
*H04W 76/02* (2009.01)
*H04W 64/00* (2009.01)
*H04W 84/04* (2009.01)

(58) Field of Classification Search
USPC .......................................................... 455/436
See application file for complete search history.

(56) References Cited

U.S. PATENT DOCUMENTS

| | | |
|---|---|---|
| 2010/0075679 A1 | 3/2010 | Tenny et al. |
| 2011/0014912 A1 | 1/2011 | Ahluwalia et al. |
| 2011/0053597 A1 | 3/2011 | Lee et al. |
| 2011/0141910 A1 | 6/2011 | Rosik |
| 2011/0287800 A1 | 11/2011 | Aoyagi et al. |
| 2012/0002594 A1 | 1/2012 | Racz et al. |
| 2012/0094667 A1 | 4/2012 | Nishida et al. |
| 2012/0127957 A1 | 5/2012 | Koskinen et al. |
| 2013/0017805 A1 | 1/2013 | Andre-Jonsson et al. |
| 2013/0040698 A1 | 2/2013 | Nakamura et al. |
| 2013/0316699 A1 | 11/2013 | Jheng et al. |

FOREIGN PATENT DOCUMENTS

| | | |
|---|---|---|
| WO | WO 2010/024111 A1 | 3/2010 |
| WO | WO 2011/008563 A2 | 1/2011 |
| WO | WO 2011/136104 A1 | 11/2011 |

OTHER PUBLICATIONS

Zte et al., UE Smart Setting of Pre-Redirection Info After LTE Redirection Failure, 3GPP Draft, R2-12201, 3GPP TSG-RAN WG2 Meeting #78, Prague, Czech Republic, May 21-25, 2012, 3 pages.
NTT Docomo, "Restriction of Inter RAT Handover/Release with Redirection/Fast Redirection Between E-UTRAN and UTRAN/GERAN in Case of Roaming", S2-122051, SA WG2 Temporary Document, SA WG2 Meeting #91, Kyoto, Japan, May 21-25, 2012, 3 pages.
NTT Docomo, "Clarification for the Use Case of RCC Connection Reject with Redirection", R2-096985, 3GPP TSG-RAN WG2 Meeting #68, Jeju, Korea, Nov. 9-13, 2009, 2 pages.
Research in Motion, Ltd., UK, "Discussion on Inter-Rat Mobility between UTRAN/GERAN and E-UTRAN with Limited E-UTRAN Roaming", S2-122689, SA WG2 Temporary Document, SA WG2 Meeting #92, Barcelona, Spain, Jul. 9-13, 2012, 4 pages.
International Search Report dated Sep. 26, 2013 in connection with International Patent Application No. PCT/KR2013/005142, 5 pages.
Non-Final Office Action dated Sep. 17, 2015 in connection with U.S. Appl. No. 14/407,448; 16 pages.

METHOD AND APPARATUS FOR CONTROLLING RE-DIRECTION BETWEEN HETEROGENEOUS MOBILE COMMUNICATION SYSTEMS

CROSS-REFERENCE TO RELATED APPLICATIONS AND CLAIM OF PRIORITY

The present application is a continuation of U.S. patent application Ser. No. 14/407,448, filed Dec. 11, 2014, which is related to and claims priority under 35 U.S.C. §365 to international Patent Application No. PCT/KR2013/005142, filed Jun. 11, 2013, entitled "METHOD AND APPARATUS FOR CONTROLLING RE-DIRECTION BETWEEN HETEROGENEOUS MOBILE COMMUNICATION SYSTEMS," and through International Patent Application No. PCT/KR2013/005142, claims benefit under 35 U.S.C. §119(b) to Korean Patent Application No. 10-2012-0109407, filed Sep. 28, 2012, Korean Patent Application No. 10-2012-0073097, filed Jul. 4, 2012, claims benefit of U.S. Provisional Application No. 61/658,141, filed Jun. 11, 2012, all of which are incorporated herein by reference into the present disclosure as if fully set forth herein.

TECHNICAL FIELD

The present disclosure relates to a method and apparatus for controlling re-direction of a User Equipment (UE) between heterogeneous mobile communication systems.

BACKGROUND ART

In general, mobile communication systems have been developed to provide communication services while guaranteeing user mobility. Thanks to rapid technical advancement, mobile communication systems are capable of providing not only voice communication services but also high-speed data communication services.

In recent years, the 3GPP (3rd Generation Partnership Project) has developed specifications for Long Term Evolution (LTE) as a next generation mobile communication system. The LTE system, also called Evolved Universal Terrestrial Radio Access Network (E-UTRAN), realizes high-speed packet based communication supporting a maximum data rate of about 100 Mbps exceeding existing data rates, aiming commercialization in 2010. To this end, various approaches have been considered, such as reducing the number of nodes on a communication path through simplification of the network architecture and bringing wireless protocols as close as possible to wireless channels.

Meanwhile, a resource to be allotted to a data service is determined according to the amount of data to be transmitted and a channel condition, unlike a voice service. Accordingly, in a wireless communication system, such as a mobile communication system, management is performed in such a way that a scheduler allocates transmission resources based on the amount of resources to be transmitted, a channel condition, and the amount of data. Such management is also performed in LTE systems, which are considered to be one of the next-generation mobile communication systems, and a scheduler located in a base station manages and allocates wireless transmission resources.

A User Equipment (UE) may connect to supportable systems, including not only an LTE communication system, but also other communication systems, such as a Universal Mobile Telecommunications System (UMTS), also called a UTRAN, in various ways such as inter-Radio Access Technologies (RAT) Handover (HO), cell-(re)selection, re-direction, and the like. Therefore, to stably support the connection, standardization and development have been conducted.

DISCLOSURE

Technical Problem

In accordance with an aspect of the present disclosure, there is provided a method for controlling re-direction between heterogeneous mobile communication systems, the method including receiving, by a User Equipment (UE), a connection request of which has been rejected by a first communication system (UTRAN), from a second communication system to which the UE intends to re-connect, information indicating that the second communication system does not support the UE, setting information for preventing re-direction to the second communication system, and sending a connection request for connection to the first communication system, which comprises the information, to the first communication system.

In accordance with another aspect of the present disclosure, there is provided a method for controlling re-direction between heterogeneous mobile communication systems, the method including receiving, from a second communication system to which a User Equipment (UE), a connection request of which has been rejected by a first communication system (UTRAN), intends to re-connect, information indicating that the second communication system does not support the UE, sending a connection request for re-connection to the first communication system and receiving a rejection message for the connection request, and ignoring an instruction for re-direction to the second communication system and searching for another suitable cell for re-connection, if the rejection message comprises the instruction for re-direction.

In accordance with another aspect of the present disclosure, there is provided a method for controlling re-direction between heterogeneous mobile communication systems, the method including receiving a connection release message from a second communication system to which a User Equipment (UE), a connection request of which has been rejected by a first communication system (UTRAN), intends to re-connect, determining whether current frequency of the second communication system is not included in frequency priority information included in the connection release message, determining the first communication system as another suitable cell for re-connection, if determining that the current frequency of the second communication system is not included in the frequency priority information, and sending the frequency priority information to the first communication system through a connection request message.

In accordance with another aspect of the present disclosure, there is provided a method for controlling re-direction between heterogeneous mobile communication systems, the method including receiving a connection request from a User Equipment (UE), determining whether the connection request of the UE needs to be rejected, if a value of an information element included in the connection request for use in configuring re-direction information to be provided to the UE indicates that a frequency resource of the second communication system is not supported, setting the re-direction information of the UE by excluding the frequency resource of the second communication system indicated by the value of the information element as not being supported, if determining that the connection request of the UE needs to be rejected, and sending a connection rejection message of the UE, which includes the set re-direction information, to the UE.

In accordance with another aspect of the present disclosure, there is provided a method for controlling re-direction between heterogeneous mobile communication systems, the method including receiving a connection request from a User Equipment (UE) and terminating connection with the UE, if information included in the connection request satisfies one of three conditions, in which among the three conditions, a first condition is when a value of an information element used to configure re-direction information to be provided to the UE indicates that a frequency resource of the second communication system is not supported, a second condition is when the value of the information element is not included in the connection request, and a third condition is when a new indicator indicating that it is not possible to perform a connection rejection procedure including an instruction for re-direction to the second mobile communication system is included.

In accordance with another aspect of the present disclosure, there is provided a User Equipment (UE) for controlling re-direction between heterogeneous mobile communication systems, the UE including a receiver configured to receive, from a second communication system to which the UE, a connection request of which has been rejected by a first communication system (UTRAN), intends to re-connect, information indicating that the second communication system does not support the UE, a message processor configured to set information for preventing re-direction to the second communication system, and a transmitter configured to send a connection request for connection to the first communication system, which comprises the information, to the first communication system.

In accordance with another aspect of the present disclosure, there is provided a User Equipment (UE) for controlling re-direction between heterogeneous mobile communication systems, the UE including a receiver configured to receive, from a second communication system to which the UE, a connection request of which has been rejected by a first communication system (UTRAN), intends to re-connect, information indicating that the second communication system does not support the UE, to send a connection request for re-connection to the first communication system, and to receive a rejection message for the connection request and a controller configured to ignore an instruction for re-direction to the second communication system and to search for another suitable cell for re-connection, if the rejection message comprises the instruction for re-direction.

In accordance with another aspect of the present disclosure, there is provided a User Equipment (UE) for controlling re-direction between heterogeneous mobile communication systems, the UE including a receiver configured to receive a connection release message from a second communication system to which the UE, a connection request of which has been rejected by a first communication system (UTRAN), intends to re-connect, a controller configured to determine whether current frequency of the second communication system is not included in frequency priority information included in the connection release message, and to determine the first communication system as another suitable cell for re-connection, if determining that the current frequency of the second communication system is not included in the frequency priority information, and a transmitter configured to send the frequency priority information to the first communication system through a connection request message.

In accordance with another aspect of the present disclosure, there is provided a base station for controlling re-direction between heterogeneous mobile communication systems, the base station including a receiver configured to receive a connection request from a User Equipment (UE), a controller configured to determine whether the connection request of the UE needs to be rejected, if a value of an information element included in the connection request for use in configuring re-direction information to be provided to the UE indicates that a frequency resource of the second communication system is not supported, and to set the re-direction information of the UE by excluding the frequency resource of the second communication system indicated by the value of the information element as not being supported, if determining that the connection request of the UE needs to be rejected, and a transmitter configured to send a connection rejection message of the UE, which includes the set re-direction information, to the UE.

In accordance with another aspect of the present disclosure, there is provided a base station for controlling re-direction between heterogeneous mobile communication systems, the base station including a receiver configured to receive a connection request from a User Equipment (UE) and a controller configured to terminate connection with the UE, if information included in the connection request satisfies one of three conditions, in which among the three conditions, a first condition is when a value of an information element used to configure re-direction information to be provided to the UE indicates that a frequency resource of the second communication system is not supported, a second condition is when the value of the information element is not included in the connection request, and a third condition is when a new indicator indicating that it is not possible to perform a connection rejection procedure including an instruction for re-direction to the second mobile communication system is included.

In accordance with another aspect of the present disclosure, there is provided a method for controlling re-direction between heterogeneous mobile communication systems, the method including setting information regarding at least one of a Radio Access Technology (RAT) allowed and an RAT disallowed for each Public Land Mobile Network (PLMN) for a User Equipment (UE) and determining an RAT to be turned off for a registered PLMN by using the information regarding the at least one of the RATs.

In accordance with another aspect of the present disclosure, there is provided a method for controlling re-direction between heterogeneous mobile communication systems, the method including checking, by a User Equipment (UE), if use of a camping RAT is allowed in a current Public Land Mobile Network (PLMN) in network registration of the UE and delivering information indicating that use of a currently used RAT is disallowed to the UE, if the use of the camping RAT is disallowed, as a result of the checking.

MODE FOR CARRYING OUT THE INVENTION

Hereinafter, various embodiments of the present disclosure will be described in relation to the accompanying drawings. In the following description, a detailed description of known functions and configurations incorporated herein will be omitted when it may obscure the subject matter of the present disclosure. Terms used herein are defined based on functions in the present disclosure and may vary according to users, operators' intention or usual practices. Therefore, the definition of the terms should be made based on contents throughout the specification.

The present invention relates to a method and apparatus for effectively controlling re-direction between heterogeneous mobile communication systems. For convenience, in the present specification, operations in heterogeneous mobile communication systems will be described, and a Universal Terrestrial Radio Access Network (UTRAN) and an Evolved Universal Terrestrial Radio Access Network (E-UTRAN) will be described as examples of the heterogeneous mobile communication systems. In general, if a particular cause occurs, the E-UTRAN (or the UTRAN) rejects a connection request of a UE and performs re-direction that facilitates connection with a counterpart system, that is, the UTRAN (or the E-UTRAN). At this time, the UE, an RRC connection request of which has been rejected by the E-UTRAN (or the UTRAN), attempts again connection to the counterpart system, that is, the UTRAN (or the E-UTRAN) based on re-direction information. However, depending on circumstances, the UE may continuously perform re-direction, failing to complete connection to any system.

Figure 1:
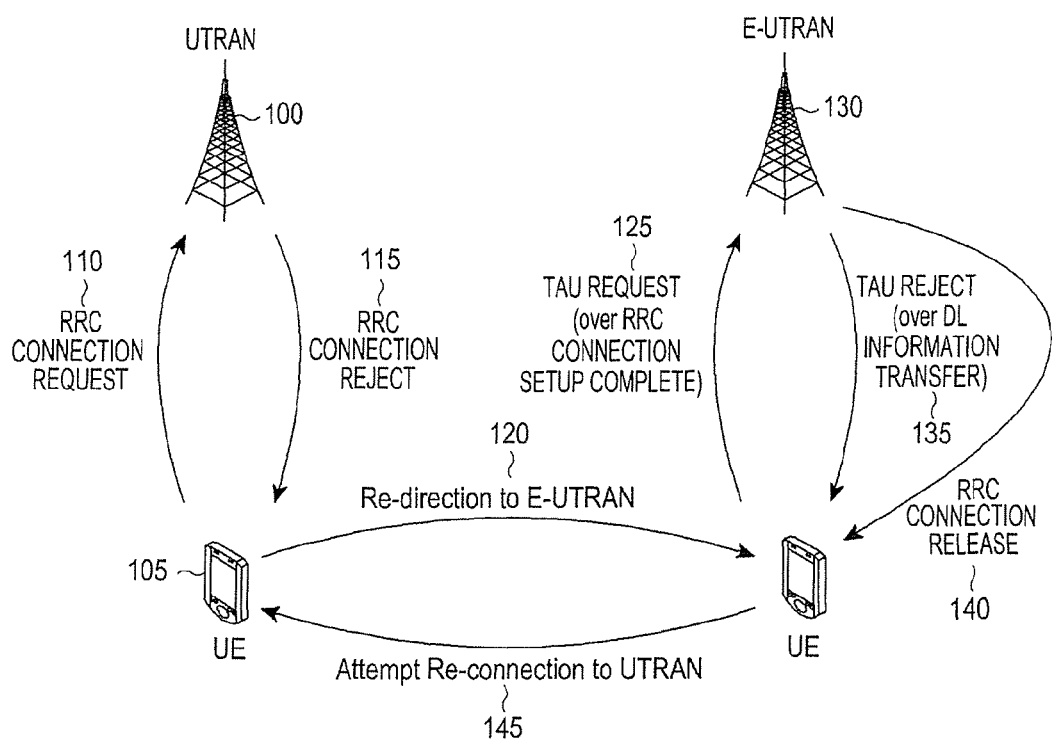
FIG. 1 is a diagram for describing a case where a UE located in a general heterogeneous mobile communication system continuously performs re-direction, failing to complete connection to any system.

FIG. 1 is a diagram for describing a case where a UE located in a general heterogeneous mobile communication system continuously performs re-direction, failing to complete connection to any system.

Referring to FIG. 1, a UE 105 intending to connect to a UTRAN attempts connection establishment with the UTRAN 100. To this end, in operation 110, the UE 105 sends a Radio Resource Control (RRC) CONNECTION REQUEST message to the UTRAN 100. If the UTRAN 100 rejects the RRC CONNECTION REQUEST message for a particular reason, the UTRAN 100 delivers an RRC CONNECTION REJECT message to the UE 105 in operation 115. The RRC CONNECTION REJECT message may include re-direction information as an option. The re-direction information may include information indicating another frequency or another system to which the UE 105 needs to attempt connection. The UE 105, the RRC connection request of which has been rejected, attempts connection to another frequency or another system based on the information in operation 120. For example, the UE 105 may be re-directed to an E-UTRAN. To this end, the UE 105 attempts connection to the E-UTRAN 130, and sends an RRC CONNECTION SETUP COMPLETE message to the E-UTRAN 130 to deliver a Tracking Area Update (TAU) REQUEST message to a Mobile Management Entity (MME) of the E-UTRAN in operation 125. The UE 105 informs the E-UTRAN 130 that the location of the UE 105 is changed to the E-UTRAN, by using the TAU REQUEST message. However, the E-UTRAN may not support the UE 105 for some reasons. One of the reasons may be, for example, because support for a service for a roaming UE may not be agreed in advance. It is assumed that one of the foregoing reasons is satisfied and thus the E-UTRAN does not support the UE 105. Then, in operation 135, the MME delivers the TAU REJECT message to the UE 105 through a DownLink (DL) INFORMATION TRANSFER message. The E-UTRAN 130 delivers an RRC CONNECTION RELEASE message to the UE 105 in operation 140, thus terminating an RRC connection mode with the UE 105. In this case, the UTRAN may be still highly likely to provide a very good channel to the UE 105. Therefore, the UE 105 re-attempts RRC connection to the UTRAN 100 in operation 145. However, the RRC CONNECTION REQUEST message of the UE 105 is rejected by the UTRAN 100, and the above-described process is repeated, such that non-connection to any system may be continued. In this case, to leave a state of non-connection to any system, an operation of UE'S re-attempting RRC connection to a system that does not support a service for the UE, for example, to the E-UTRAN needs to be restricted.

RRC connection with the UTRAN and the E-UTRAN provided in the foregoing description is closely associated with the present disclosure and thus will be further described in detail.

Figure 2:
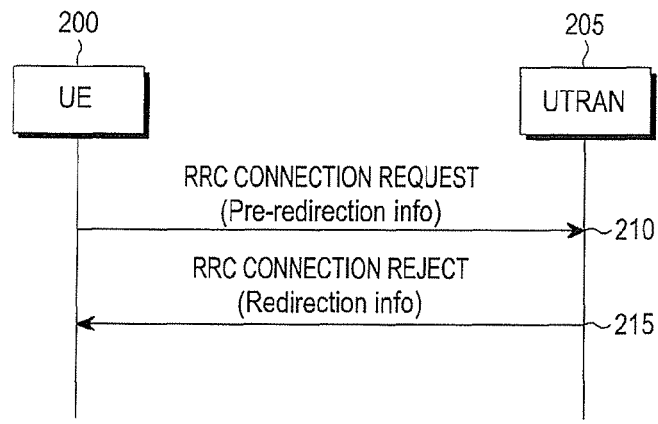
FIG. 2 is a diagram for describing a general connection request and reject process between a UE and a UTRAN.

FIG. 2 is a diagram for describing a general connection request and reject process between a UE and a UTRAN.

Referring to FIG. 2, in operation 210, a UE 200 sends an RRC CONNECTION REQUEST message to a UTRAN 205 for connection to the UTRAN, thus requesting connection with the UTRAN. This operation is called a connection establishment process. The RRC CONNECTION REQUEST message may include an Information Element (IE) regarding pre-redirection information as shown in Table 1. Referring to Table 1, the IE shows E-UTRAN Frequency Division Duplex (FDD) or E-UTRAN Time Division Duplex (TDD) the UE 200 may support. The IE may include two IEs having a Boolean type value ('1' or '0' indicating true or false, respectively). If the UE 200 is capable of supporting E-UTRAN FDD, 'IE support of E-UTRA FDD' is indicated as 'supportable', that is, '1'. The UTRAN 205 configures re-direction information to be provided to the UE 200, by using the value of the IEs.

TABLE 1

Pre-redirection info (refer to TS25.331)

| Information Element/Group name | Need | Multi | Type and Reference | Semantics description | Version |
|---|---|---|---|---|---|
| Support of E-UTRA FDD | P | | Boolean | | REL-8 |
| Support of E-UTRA TDD | P | | Boolean | | REL-8 |

If the RRC REQUEST message is rejected, the UTRAN 205 sends the RRC CONNECTION REJECT message to the UE 200 in operation 215. The RRC CONNECTION REJECT message may include IE Re-direction information. Referring to Table 2, in the IE, another frequency or another system to which the UE is to be re-directed is indicated.

TABLE 2

Re-direction info

| Information Element/Group name | Need | Multi | Type and reference | Semantics description | Version |
|---|---|---|---|---|---|
| CHOICE Redirection Information | MP | | | | |
| >Frequency info | | | Frequency info 10.3.6.36 | | |
| >Inter-RAT info | | | Inter-RAT info 10.3.7.25 | | |

Figure 3:
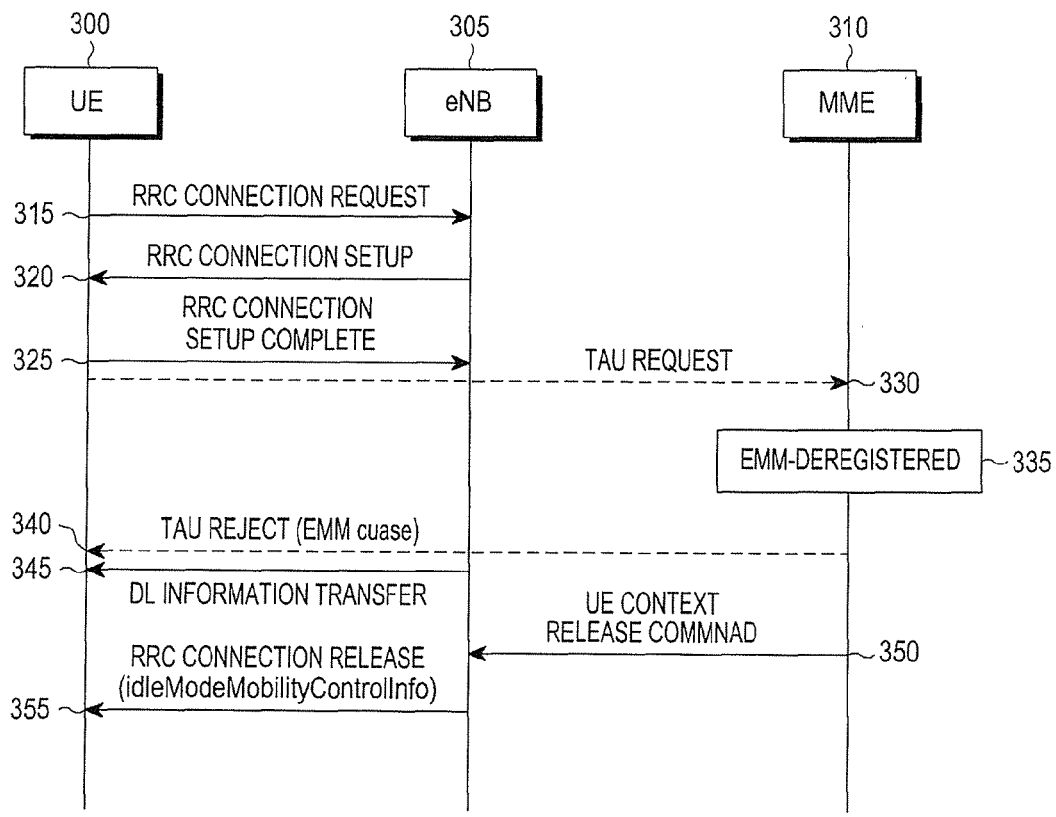
FIG. 3 is a diagram for describing a general TAU process between a UE and a UTRAN.

FIG. 3 is a diagram for describing a general TAU process between a UE and a UTRAN.

Referring to FIG. 3, if a UE 300 newly attempts connection to an E-UTRAN, the UE 300 has to inform an MME 310 that the location of the UE 300 is changed to the E-UTRAN, which is called a TAU process. To this end, the UE 300 needs to perform an RRC connection establishment process. That is, the UE 300 sends an RRC CONNECTION REQUEST message to the E-UTRAN 305 in operation 315. Then, in operation 320, the E-UTRAN 305 sends an RRC CONNECTION SETUP message to the UE 300. The UE 300 delivers an RRC CONNECTION SETUP COMPLETE message to the E-UTRAN 305 in operation 325. The RRC CONNECTION SETUP COMPLETE message may include an NAS container and a TAU REQUEST message to be delivered to the MME. Thus, although not shown, the E-UTRAN 305 transparently delivers the NAS container obtained from the RRC CONNECTION SETUP COMPLETE message to the MME 310 without decoding the NAS container. As a result, in operation 330, the UE 300 sends the TAU REQUEST message to the MME 310. However, as mentioned above, the E-UTRAN may not support the UE 300 for a particular reason. If the E-UTRAN does not support the UE 300, the MME 310 declares an Evolved Packet System Mobility Management (EMM)-DEREGISTERED state with respect to the UE 300 in operation 335. Once entering the EMM-DEREGISTERED state, the UE 300 fails to be successfully registered in the MME 310 and thus is detached from the MME 310. The MME 310 sends a TAU REJECT message to the UE in operation 340. The TAU REJECT message includes an IE EMM cause indicating a reason for rejection of the TAU REQUEST message. Table 3 provided below shows an example of the IE EMM cause, and indicates a reason for rejection by using a total of 2 bytes.

TABLE 3

Cause value Octet 2 Bits

| 8 | 7 | 6 | 5 | 4 | 3 | 2 | 1 | |
|---|---|---|---|---|---|---|---|---|
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS service not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLAN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 1 | 0 | 0 | 0 | 1 | 1 | Requested service option not authorized |
| 0 | 0 | 1 | 0 | 0 | 1 | 1 | 1 | CS service temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

EMM cause information element

The E-UTRAN 305 uses a DL INFORMATION TRANSFER message in operation 345 to deliver the TAU REJECT message to the UE 300. The MME 310 delivers a UE CONTEXT RELEASE COMMAND message to the E-UTRAN 305 in operation 350, thus indicating termination of an RRC connection mode of the UE 300 to the E-UTRAN 305. Then, the E-UTRAN 305 having received the UE CONTEXT RELEASE COMMAND message delivers an RRC CONNECTION RELEASE message to the UE 300 in operation 355, thus indicating termination of the RRC connection mode to the UE 300. The RRC CONNECTION RELEASE message may include frequency priority information IE idleModeMobilityControlInfo id as an option. The IE indicates a system-specific frequency priority when the UE performs cell re-selection to another frequency. Herein, the current frequency of an E-UTRAN having rejected the UE 300 of FIG. 3 as an example of a system having rejected a UE may be excluded from a priority included in the frequency priority information IE idleModeMobilityControlInfo.

Hereinafter, the present disclosure will propose a method for preventing a UE rejected by an E-UTRAN in terms of a TAU process from re-attempting connection to the E-UTRAN after failing in RRC connection to a UTRAN.

First Embodiment

In a first embodiment of the present disclosure, based on an IE EMM cause value of a TAU REJECT message received from an MME or frequency priority information of an RRC CONNECTION RELEASE message received from an E-UTRAN, an UE sets IE Pre-redirection info of an RRC CONNECTION REQUEST message to be sent to a UTRAN. That is, to prevent the UTRAN from indicating re-direction to the E-UTRAN having rejected RRC CONNECTION REQUEST message, the UE sets values of IEs included in the IE Pre-redirection info to indicate that E-UTRA FDD or E-UTRA TDD corresponding to the rejecting E-UTRAN is not supported.

Figure 4:
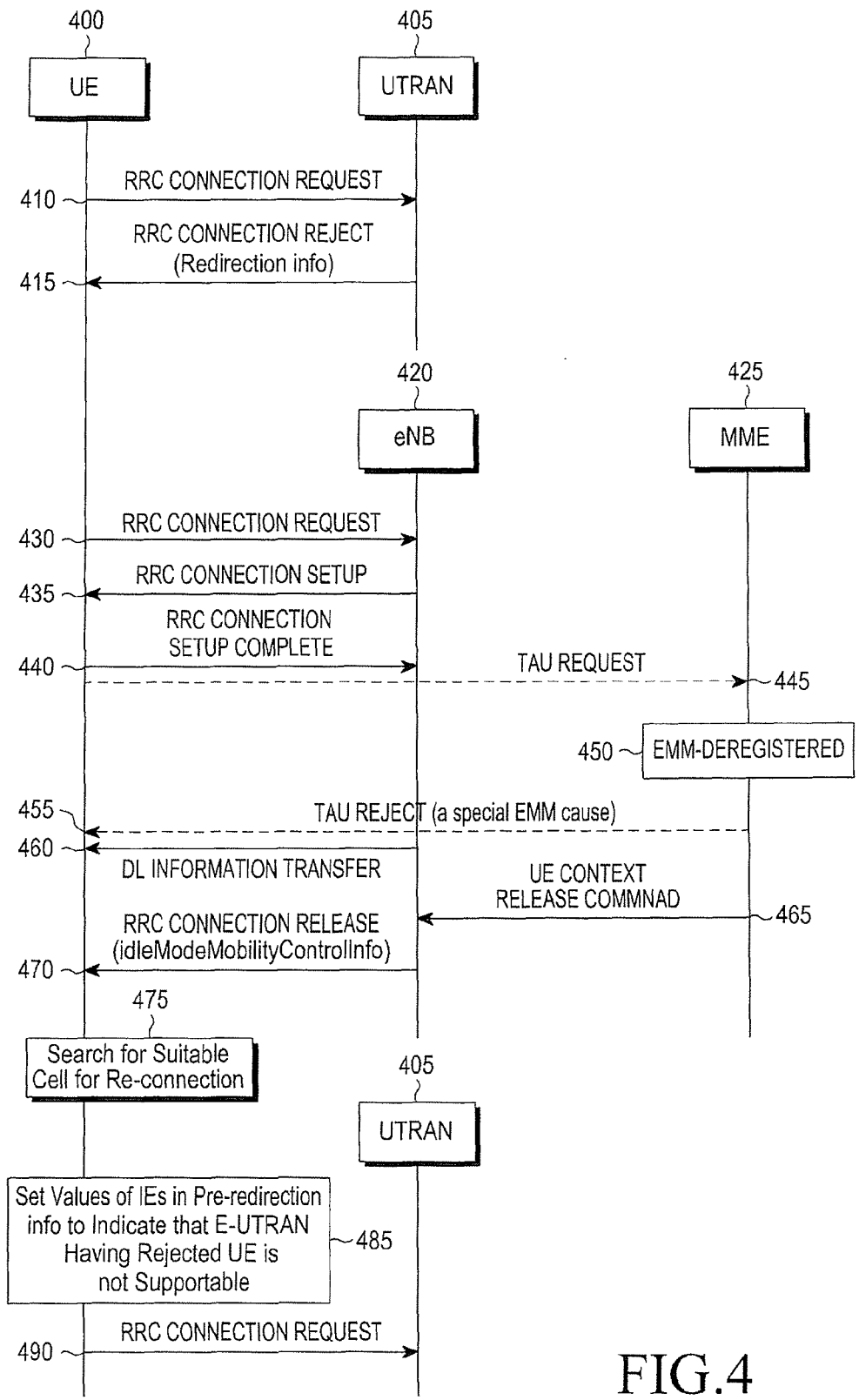
FIG. 4 is a flowchart illustrating operations according to a first embodiment of the present disclosure.

FIG. 4 is a flowchart illustrating operations according to the first embodiment of the present disclosure.

Referring to FIG. 4, operations 410 and 415 are the same as operations 210 and 215 of FIG. 2, and thus will not be described in detail. Likewise, operations 430 through 470 correspond to the description of FIG. 3, and thus will not be described in detail. For example, E-UTRAN 420 and MME 425 of FIG. 4 can be the same as or similar to E-UTRAN 305 and MME 310, respectively, of FIG. 3. However, in operation 455, an IE EMM cause of a TAU REJECT message sent to a UE 400 by an MME is indicated by a particular value among conventionally defined values or by a newly defined value according to the first embodiment of the present disclosure. For example, referring to Table 3, when the IE EMM cause has a value 'Tracking Area not allowed' among various values of conventionally defined Clause, an operation proposed in the first embodiment of the present disclosure will be performed. Alternatively, a newly EMM cause value may be defined in addition to the various values of conventionally defined Clause.

It is assumed that the IE EMM cause of the TAU REJECT message indicates 'Tracking Area not allowed' or includes a newly defined EMM cause value in operation 455. Then, in operation 475, the UE 400, an RRC connection request of which has been rejected by an E-UTRAN, searches for a UTRAN as a suitable cell for re-connection. Herein, for convenience, it is described as an example that the found UTRAN is the same as the UTRAN having rejected RRC connection, but the found UTRAN may not be the same as the rejecting UTRAN.

In operation 485, the UE 400 sets values of IEs of Pre-redirection info to indicate that the previously rejecting E-UTRAN is not supportable. More specifically, the UE 400 sets the IEs of Pre-redirection info, that is, 'IE Support of E-UTRA FDD' and 'Support of E-UTRA TDD' to indicate that the E-UTRAN is not supportable. In another way, instead of considering an EMM cause value, frequency priority information IE idleModeMobilityControlInfo of the RRC CONNECTION RELEASE message may be used. That is, the current frequency of the E-UTRAN having rejected RRC connection is excluded from the frequency priority information IE idleModeMobilityControlInfo. Thus, the UE 400 sets a value corresponding to the E-UTRAN excluded from the frequency priority information IE idleModeMobilityControlInfo to indicate 'non-supportable' in IE Support of E-UTRA FDD or Support of E-UTRA TDD. The UE 400 sends an RRC CONNECTION REQUEST message including the set IEs to the UTRAN 405 in operation 490.

Figure 5:
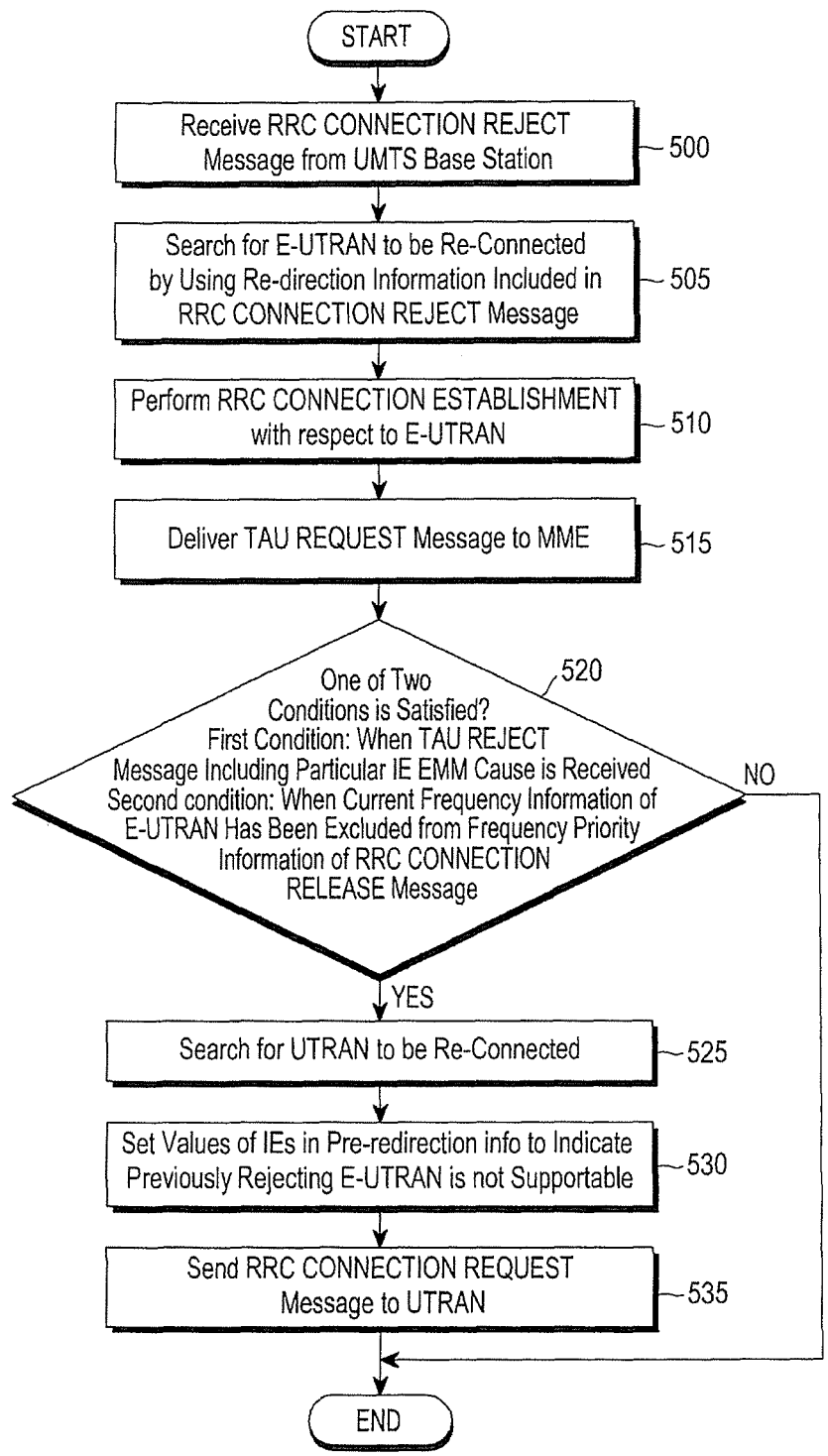
FIG. 5 is a flowchart illustrating operations of a UE according to a first embodiment of the present disclosure.

FIG. 5 is a flowchart illustrating operations of an UE according to the first embodiment of the present disclosure.

Referring to FIG. 5, in operation 500, an UE receives an RRC CONNECTION REJECT message from a UTRAN. In operation 505, the UE searches for a suitable cell for re-connection, that is, an E-UTRAN, by using re-direction information included in the received RRC CONNECTION REJECT message. In operation 510, the UE performs RRC CONNECTION ESTABLISHMENT with respect to the E-UTRAN. In operation 515, the UE delivers a TAU REQUEST message to an MME. In operation 520, as stated above with reference to FIG. 4, the UE determines whether one of two conditions is satisfied, and the UE sets IE Pre-redirection info of the RRC CONNECTION REQUEST message based on the determination result. The first condition is when an IE EMM cause value of a TAU REJECT message indicates a predetermined value, that is, 'Tracking Area not allowed'. The second condition is when current frequency information of the E-UTRAN is excluded from frequency priority information of an RRC CONNECTION RELEASE message, that is, from a priority in the frequency priority information idleModeMobilityControlInfo. In operation 520, if at least one of the two conditions is satisfied, the UE determines whether to perform subsequent processes, that is, operations 525 through 535. The pre-defined value may use a particular value among conventionally defined values or a value newly defined according to the first embodiment of the present disclosure.

If that the UE determines that any one of the two conditions is not satisfied, the first embodiment of the present disclosure is not applied. That is, if the UE fails to receive the TAU REJECT message, this condition corresponds to a case where the UE fails to obtain a predefined value or a newly defined IE EMM cause or receives the RRC CONNECTION RELEASE message that does not include the frequency priority information. In operation 525, the UE searches for a UTRAN for re-connection. In operation 530, the UE sets values of IEs of Pre-redirection info to indicate that the current frequency of the E-UTRAN having rejected RRC connection is not supportable. More specifically, the UE sets the value of the IEs of Pre-redirection info, that is, 'IE Support of E-UTRA FDD' or 'Support of E-UTRA TDD', to indicate that the current frequency is not supportable. In operation 535, the UE sends the RRC CONNECTION REQUEST message including the IE values set as described above to the UTRAN.

Figure 6:
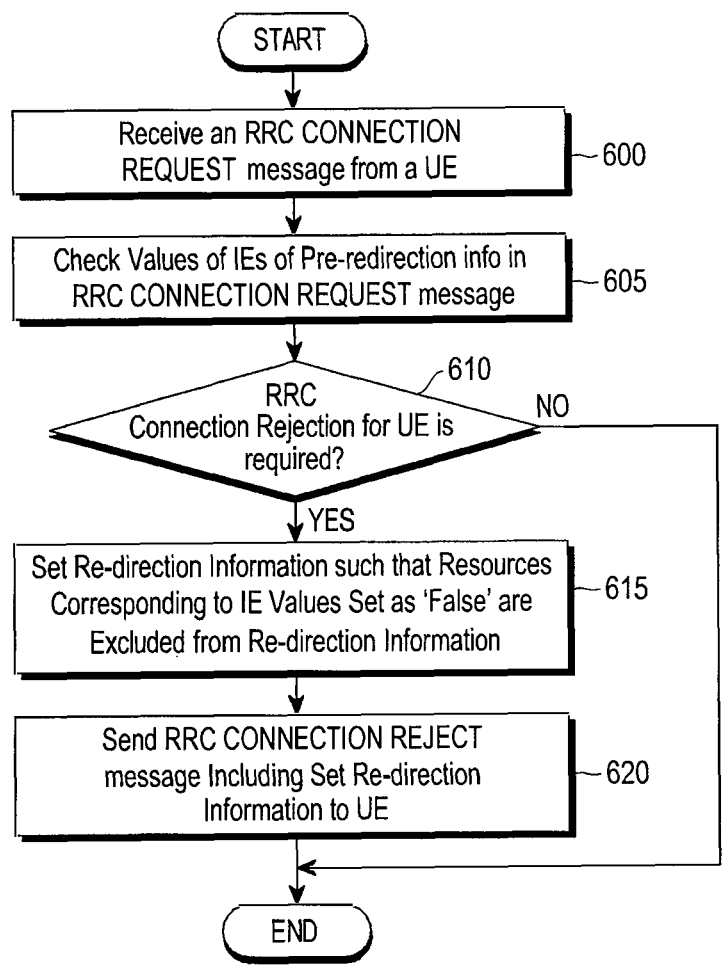
FIG. 6 is a flowchart illustrating operations of a UTRAN according to a first embodiment of the present disclosure.

FIG. 6 is a flowchart illustrating operations of a UTRAN according to the first embodiment of the present disclosure.

Referring to FIG. 6, in operation 600, the UTRAN receives an RRC CONNECTION REQUEST message from a UE. In operation 605, the UTRAN determines whether values of IEs of Pre-redirection info in the RRC CONNECTION REQUEST message, that is, values of 'IE Support of E-UTRA FDD' and 'Support of E-UTRA TDD' are 'True' or 'False'. If the values of 'IE Support of E-UTRA FDD' and 'Support of E-UTRA TDD' are all 'True', they indicate that both E-UTRA FDD and E-UTRA TDD are supportable. If the values of 'IE Support of E-UTRA FDD' and 'Support of E-UTRA TDD' are all 'False', they indicate that either E-UTRA FDD or E-UTRA TDD is not supportable in the UE. Thus, when re-direction of the UE is indicated, E-UTRA FD or E-UTRA TDD indicated as 'False' may be excluded. Therefore, in operation 610, the UTRAN determines whether RRC connection rejection for the UE is required. In operation 615, the UTRAN sets re-direction information such that the E-UTRA FDD or E-UTRA TDD indicated as 'False' is excluded from the re-direction information. If the RRC CONNECTION REQUEST message of the UE is rejected, the UTRAN sends an RRC CONNECTION REJECT message including the above-set re-direction information to the UE in operation 620.

Figure 7:
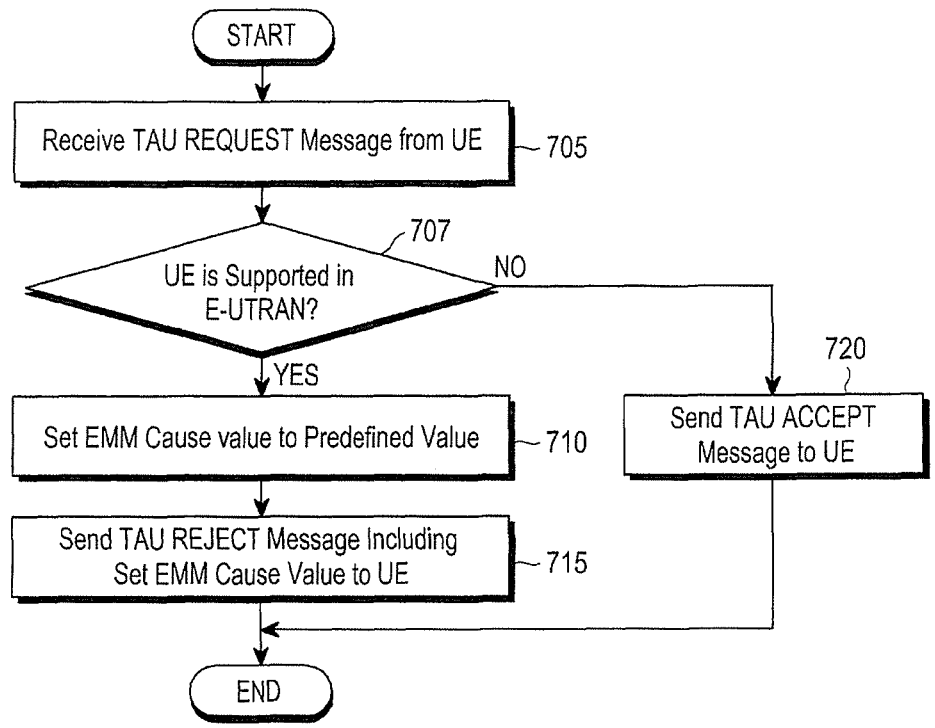
FIG. 7 is a flowchart illustrating operations of an MME according to a first embodiment of the present disclosure.

FIG. 7 is a flowchart illustrating operations of an MME according to the first embodiment of the present disclosure.

Referring to FIG. 7, in operation 705, the MME receives a TAU REQUEST message from a UE. Then, in operation 707, the MME determines whether the UE is supported in the E-UTRAN according to a predetermined requirement. As an example of the predetermined requirement, roaming of the UE is used. For example, it is assumed that a UE which is roaming is not supported in the E-UTRAN.

If determining that the UE is supported in the E-UTRAN, the MME sends a TAU ACCEPT message to the UE in operation 720. On the other hand, if determining that the UE is not supported in the E-UTRAN, the MME sets an EMM cause value to a predefined value indicating that the UE is not supported in the E-UTRAN in operation 710. In operation 715, the MME sends a TAU REJECT message including the set EMM cause value to the UE.

Figure 8:
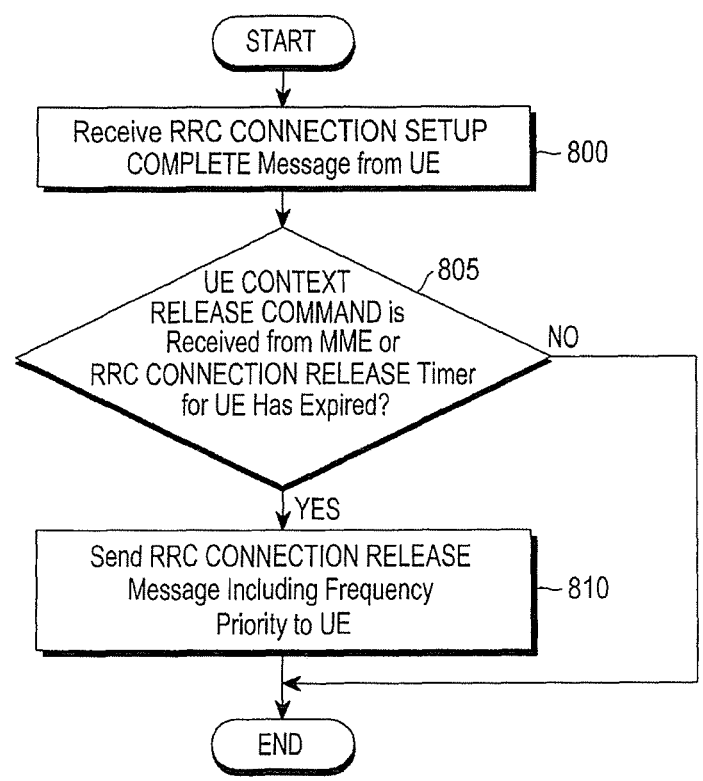
FIG. 8 is a flowchart illustrating operations of an E-UTRAN according to a first embodiment of the present disclosure.

FIG. 8 is a flowchart illustrating operations of an E-UTRAN according to the first embodiment of the present disclosure.

Referring to FIG. 8, in operation 800, the E-UTRAN receives an RRC CONNECTION SETUP COMPLETE message from the UE. In operation 805, the E-UTRAN determines whether a UE CONTEXT RELEASE COMMAND is received from the MME or an RRC CONNECTION RELEASE timer for the UE has expired. If determining that the E-UTRAN receives the UE CONTEXT RELEASE COMMAND from the MME or the RRC CONNECTION RELEASE timer for the UE has expired, then the E-UTRAN sends an RRC CONNECTION RELEASE message including frequency priority information IE idleMode-MobilityControlInfo to the UE in operation 810. If determining that the E-UTRAN does not receive the UE CONTEXT RELEASE COMMAND from the MME and the RRC CONNECTION RELEASE timer for the UE has not expired, the E-UTRAN stops operating.

Second Embodiment

In the second embodiment of the present disclosure, based on an IE EMM cause value of a TAU REJECT message received from an MME or frequency priority information of an RRC CONNECTION RELEASE message received from an E-UTRAN, a UE determines to instruct an UTRAN not to perform an RRC connection rejection procedure including an instruction for re-direction to the E-UTRAN, and explicitly or implicitly indicates the determination to the UTRAN. A method for explicitly indicating the determination includes defining a new indicator instructing the UTRAN not to perform the RRC connection rejection procedure including an instruction for re-direction to the E-UTRAN and delivering the new indicator to the UTRAN through an RRC CONNECTION REQUEST message. In an alternative way to define the indicator, the UTRAN may be instructed not to perform any re-direction for the UE, or an RAT list for which re-direction should not be performed may be included in the RRC CONNECTION REQUEST message. A method for implicitly indicating the determination includes setting IEs included in conventional Pre-redirection info, that is, both 'IE Support of E-UTRA FDD' and 'Support of E-UTRA TDD' to 'False', and sending the RRC CONNECTION REQUEST message including all of or none of the set IEs to the UTRAN. In this way, the UE instructs the UTRAN not to perform the RCC connection rejection procedure including an instruction for re-direction to the E-UTRAN.

Figure 9:
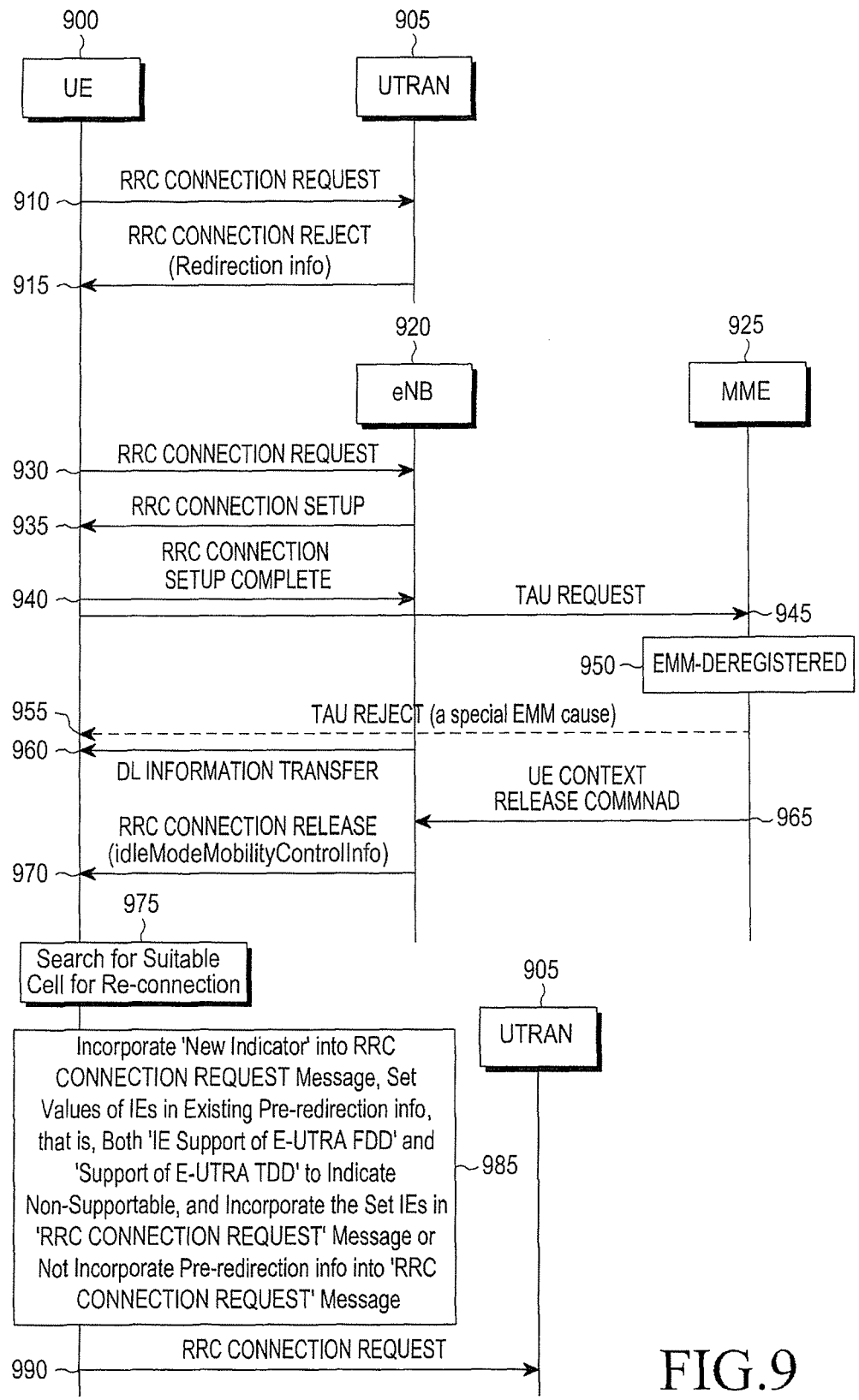
FIG. 9 is a flowchart illustrating operations according to a second embodiment of the present disclosure.

FIG. 9 is a flowchart illustrating operations according to the second embodiment of the present disclosure.

Referring to FIG. 9, operations 910 and 915 are the same as operations 210 and 215 of FIG. 2 and thus will not be described in detail. For example, UTRAN 905 of FIG. 9 can be the same as or similar to UTRAN 205 of FIG. 2 and E-UTRAN 920 of FIG. 9 can be the same as or similar to eNB 305 of FIG. 3. Likewise, operations 930 through 970 correspond to the description made with reference to FIG. 3, and thus will not be described in detail. In operation 955, an IE EMM cause of a TAU REJECT message sent from an MME 925 to a UE 900 has a value out of conventionally defined values or a value newly defined according to the second embodiment of the present disclosure. For example, referring to Table 3, when the IE EMM cause has 'Tracking Area not allowed' out of various values of conventionally defined Clause, an operation proposed in the second embodiment of the present disclosure will be performed. Alternatively, a new EMM cause value may be defined in addition to the various values of the conventionally defined Clause. In operation 975, the UE 900, an RRC CONNECTION REQUEST message of which has already been rejected by an E-UTRAN, searches for an UTRAN as a suitable cell for re-connection. Herein, for convenience, it is described as an example that the found UTRAN is the same as the UTRAN having rejected RRC connection, but the found UTRAN may not be the same as the rejecting UTRAN. In operation 985, the UE 900 instructs the UTRAN 905 not to perform an RRC connection rejection procedure including an instruction for re-direction to the E-UTRAN in one of two ways. In the first way, the UE 900 incorporates a newly defined indicator indicating the instruction into an RRC CONNECTION REQUEST message. In the second way, the UE 900 sets values of IEs in Pre-redirection info, that is, both 'IE Support of E-UTRA FDD' and 'Support of E-UTRA TDD' to indicate non-supportable, and incorporates or does not incorporate the IEs in the RRC CONNECTION REQUEST message. In operation 990, the UE 900 sends the RRC CONNECTION REQUEST message that includes the new indicator or the IEs or does not include Pre-redirection info to the UTRAN 905.

Figure 10:
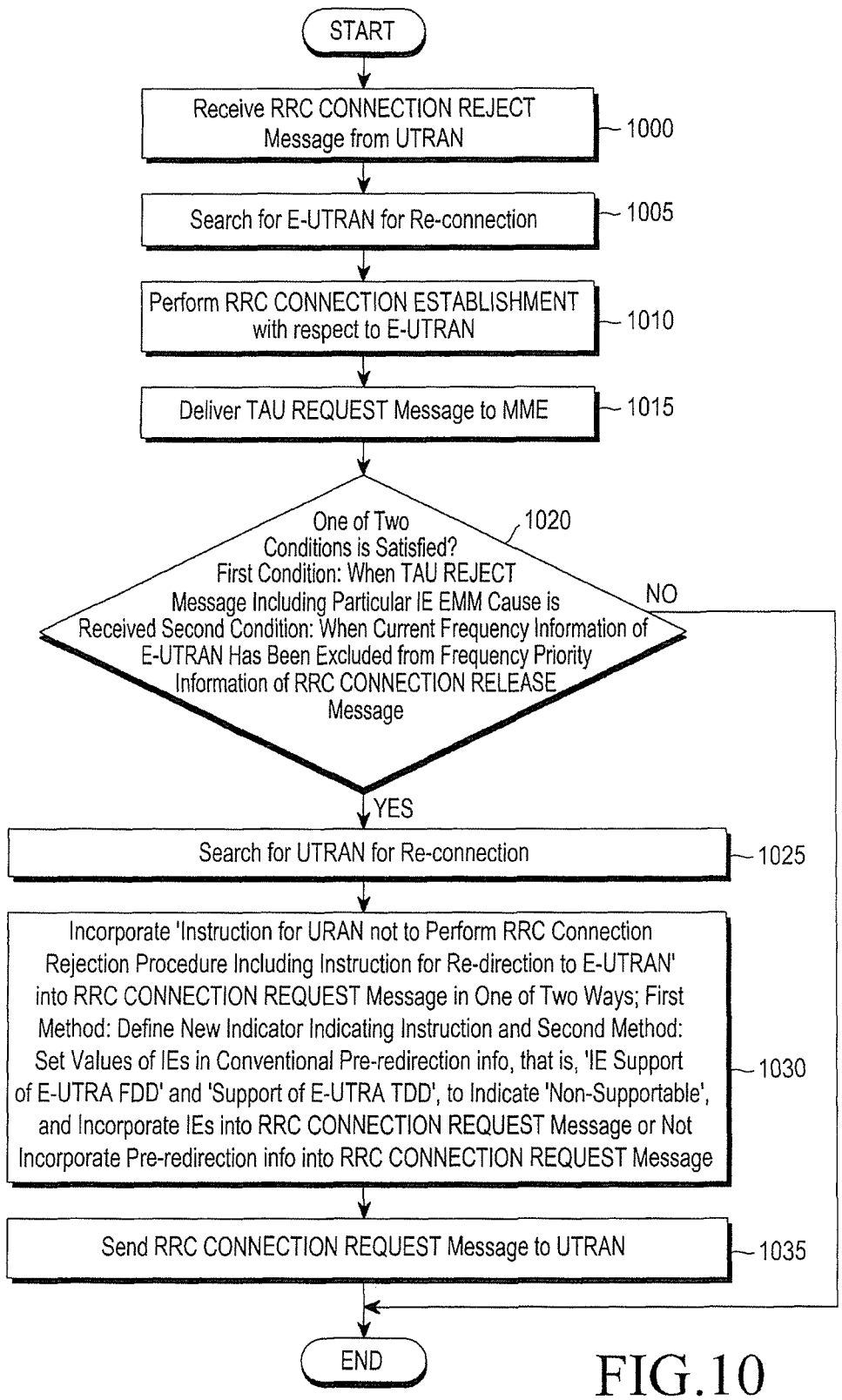
FIG. 10 is a flowchart illustrating operations of a UE according to a second embodiment of the present disclosure.

FIG. 10 is a flowchart illustrating operations of a UE according to the second embodiment of the present disclosure.

Referring to FIG. 10, in operation 1000, the UE receives an RRC CONNECTION REJECT message from the UTRAN. In operation 1005, the UE searches for a suitable cell for re-connection, that is, the E-UTRAN, by using re-direction information included in the RRC CONNECTION REJECT message. In operation 1010, the UE performs RRC CONNECTION ESTABLISHMENT with respect to the E-UTRAN. In operation 1015, the UE delivers a TAU REQUEST message to the MME. In operation 1020, as mentioned previously with reference to FIG. 9, the UE determines whether one of two conditions is satisfied, and determines whether to instruct the UTRAN to not to perform the RRC connection rejection procedure including an instruction for re-direction to the E-UTRAN. The first condition is when an IE EMM cause value of the TAU REJECT message indicates a predefined value, that is, 'Tracking Area not allowed'. The second condition is when the current frequency information of the E-UTRAN has been excluded from frequency priority information idleModeMobilityControlInfo, in the RRC CONNECTION RELEASE message. In operation 1020, the UE determines whether at least one of the two conditions is satisfied to determine whether to instruct the UTRAN not to perform the RRC connection rejection procedure including an instruction for re-direction to the E-UTRAN. If determining that at least one of the two conditions is satisfied, the UE performs subsequent operations, that is, operations 1025 through 1035 according to the second embodiment of the present disclosure.

If none of the two conditions is satisfied, the second embodiment of the present disclosure is not applied. For example, this case may correspond to when the UE does not receive a TAU REJECT message, when the UE fails to obtain the predefined value or the newly defined IE EMM cause value, or the UE receives an RRC CONNECTION RELEASE message not including frequency priority information. In operation 1025, the UE searches for a UTRAN for re-connection. In operation 1030, the UE sets an 'instruction for the UTRAN not to perform the RRC connection rejection procedure including an instruction for re-direction to the E-UTRAN' in the RRC CONNECTION REQUEST message in one of two ways.

In the first way, the UE defines a new indicator indicating the instruction and incorporates the new indicator into the RRC CONNECTION REQUEST message. In the second way, the UE sets values of IEs in Pre-redirection info, that is, both 'IE Support of E-UTRA FDD' and 'Support of E-UTRA TDD', as non-supportable or does not incorporate Pre-redirection info into the RRC CONNECTION REQUEST message. In operation 1035, the UE sends the RRC CONNECTION REQUEST message that includes the new indicator or the IEs or does not include the IEs to the UTRAN.

Figure 11:
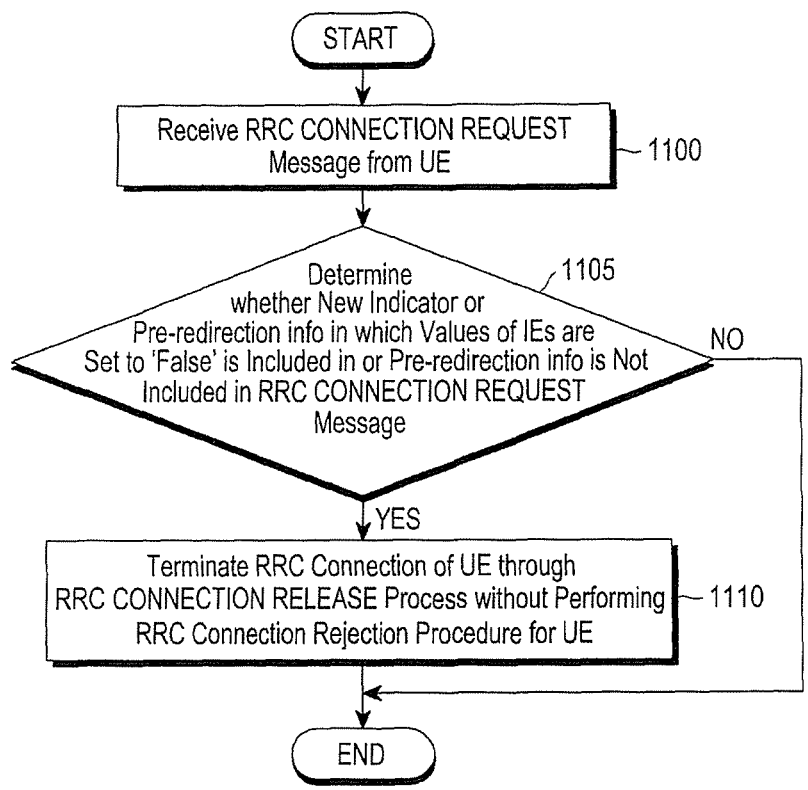
FIG. 11 is a flowchart illustrating operations of a UTRAN according to a second embodiment of the present disclosure.

FIG. 11 is a flowchart illustrating operations of a UTRAN according to the second embodiment of the present disclosure.

Referring to FIG. 11, in operation 1100, the UTRAN receives an RRC CONNECTION REQUEST message from a UE. In operation 1105, the UTRAN checks information in the RRC CONNECTION REQUEST message. More specifically, the UTRAN determines whether a new indicator or Pre-redirection info is included in the RRC CONNECTION REQUEST message or Pre-redirection info is not included in the RRC CONNECTION REQUEST message. If Pre-redirection info is included, the UTRAN further determines whether IEs of Pre-redirection info, that is, both 'IE Support of E-UTRA FDD' and 'Support of E-UTRA TDD' are 'False'.

If determining that the new indicator or 'IE Support of E-UTRA FDD' and 'Support of E-UTRA TDD' indicated as 'False' are included in the RRC CONNECTION REQUEST message or Pre-redirection info is not included in the RRC CONNECTION REQUEST message, the UTRAN recognizes that the RRC connection rejection procedure including an instruction for re-direction to the E-UTRAN for the UE is not possible, and goes to operation 1110. In operation 1110, the UTRAN determines not to perform the RRC connection rejection procedure including re-direction to the E-UTRAN for the UE. The UTRAN terminates RRC connection of the UE through an RRC CONNECTION RELEASE process.

If determining that none of the new indicator and Pre-redirection info is included in the RRC CONNECTION REQUEST message or both 'IE Support of E-UTRA FDD' and 'Support of E-UTRA TDD' in Pre-redirection info are not indicated as 'False', the UTRAN performs a general procedure required according to CONNECTION REQUEST of the UE.

Flows of operations of the MME and the E-UTRAN according to the second embodiment of the present disclosure are the same as those of the MME and the E-UTRAN according to the first embodiment of the present disclosure illustrated in FIGS. 7 and 8, and thus will not be described in detail.

Third Embodiment

In a third embodiment of the present disclosure, based on an IE EMM cause value of a TAU REJECT message received from an MME or frequency priority information of an RRC CONNECTION RELEASE message received from an E-UTRAN, the UE ignores an RRC CONNECTION REJECT message indicating re-direction to the E-UTRAN, sent from the UTRAN, and searches for another suitable cell for re-connection.

Figure 12:
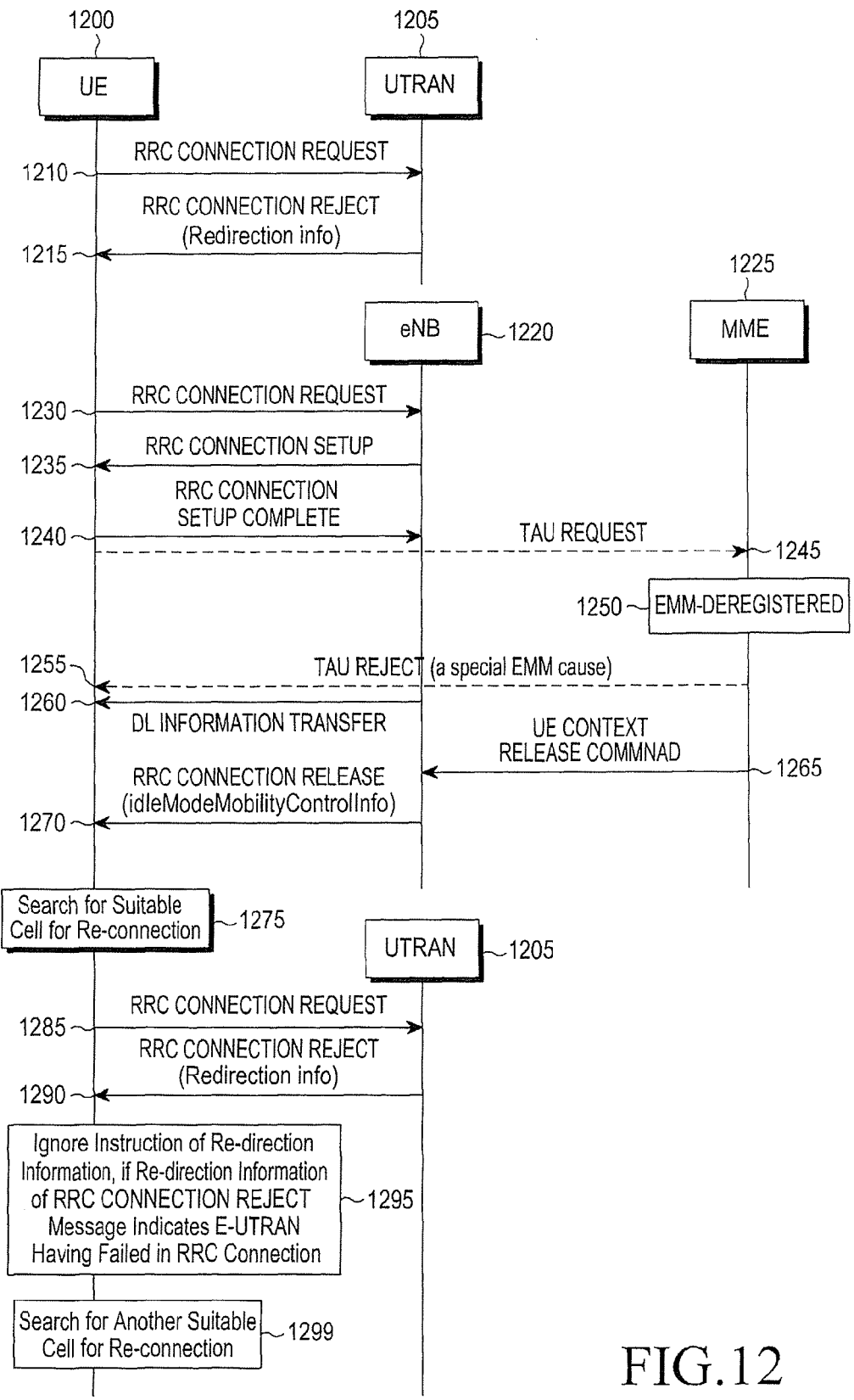
FIG. 12 is a flowchart illustrating operations according to a third embodiment of the present disclosure.

FIG. 12 is a flowchart illustrating operations according to the third embodiment of the present disclosure.

Referring to FIG. 12, operations 1210 and 1215 are the same as operations 210 and 215 of FIG. 2, and thus will not be described in detail. Likewise, operations 1230 through 1270 correspond to the description made with reference to FIG. 3, and thus will not be described in detail. For example, E-UTRAN 1220 of FIG. 12 can be the same as or similar to UTRAN 305 of FIG. 3 However, in operation 1255, an IE EMM cause of a TAU REJECT message sent from an MME 1225 to a UE 200 has a value out of conventionally defined values or a value newly defined according to the third embodiment of the present disclosure. For example, referring to Table 3, operations proposed in the third embodiment of the present disclosure are performed when the IE EMM cause has 'Tracking Area not allowed' among various values of conventionally defined Clause. Alternatively, a new EMM cause value may be defined in addition to the various values of conventionally defined Clause. In operation 1275, a UE 1200, an RRC connection request of which has been rejected by the E-UTRAN, searches for a UTRAN as a suitable cell for re-connection. Herein, for convenience, it is described as an example that the found UTRAN is the same as the UTRAN having rejected RRC connection, but the found UTRAN may not be the same as the rejecting UTRAN. In operation 1285, the UE 1200 sends an RRC CONNECTION REQUEST message to the UTRAN. In operation 1290, the UTRAN 1205 delivers an RRC CONNECTION REJECT message including re-direction information to the UE 1200. Herein, the re-direction information indicates a system to which the UE is to be re-directed. In operation 1295, if determining that the UE 1200 has attempted RRC connection to the E-UTRAN to which re-direction is to be performed as indicated by the re-direction information and has failed in the RRC connection (operations 1230 through 1270), then the UE 1200 ignores the re-direction instruction. In operation 1299, the UE 1200 searches for another suitable cell for re-connection.

Figure 13:
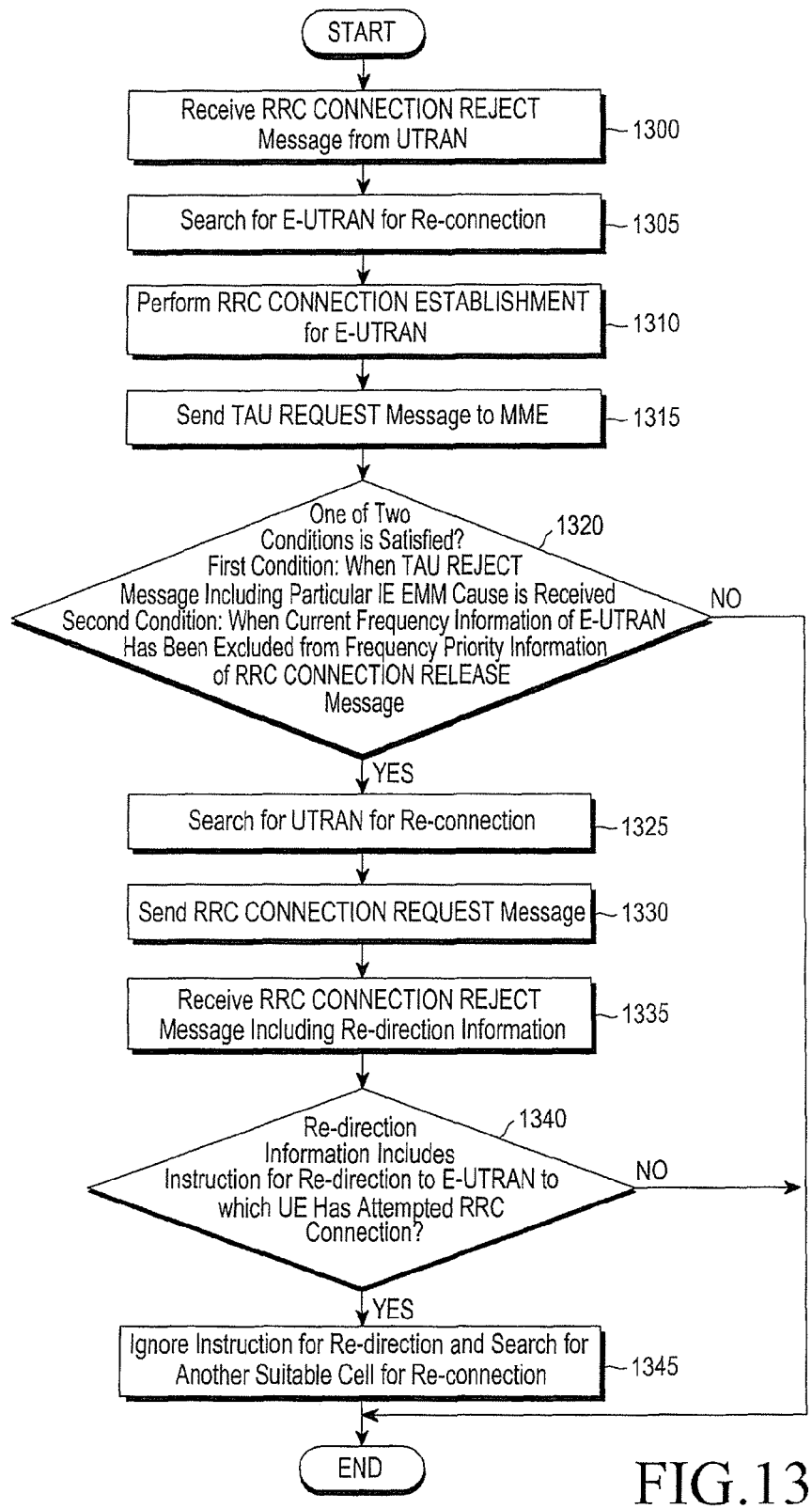
FIG. 13 is a flowchart illustrating operations of a UE according to a third embodiment of the present disclosure.

FIG. 13 is a flowchart illustrating operations of the UE according to the third embodiment of the present disclosure.

Referring to FIG. 13, in operation 1300, the UE receives an RRC CONNECTION REJECT message from the UTRAN. In operation 1305, the UE searches for a suitable cell for re-connection, that is, the E-UTRAN, by using re-direction information included in the RRC RECONNECTION REJECT message. In operation 1310, the UE performs RRC CONNECTION ESTABLISHMENT with respect to the E-UTRAN. In operation 1315, the UE delivers a TAU REQUEST message to the MME. In operation 1320, as mentioned previously, the UE determines whether one of the two conditions is satisfied, and determines whether to ignore the re-direction an instruction for the re-direction information included in the RRC CONNECTION REJECT message based on the determination result. That is, the first condition is when the IE EMM cause value of the TAU REJECT message indicates a predefined value, that is, 'Tracking Area not allowed'. The second condition is when the current frequency information of the E-UTRAN has been excluded from a priority of the frequency priority information idleModeMobilityControlInfo in the RRC CONNECTION RELEASE message. If determining that at least one of the two conditions is satisfied, the UE performs operations 1325 through 1345 according to the third embodiment of the present disclosure. If determining that none of the two conditions is satisfied, the third embodiment of the present disclosure is not applied.

In operation 1325, the UE searches for a suitable cell for re-connection, that is, the UTRAN. Herein, for convenience, it is described as an example that the found UTRAN is the same as the UTRAN having rejected RRC connection, but the found UTRAN may not be the same as the rejecting UTRAN.

Then, in operation 1330, for connection to the UTRAN, the UE sends an RRC CONNECTION REQUEST message to the UTRAN. In operation 1335, the UE receives an RRC CONNECTION REJECT message including re-direction information from the UTRAN. In operation 1340, the UE determines whether the re-direction information includes an instruction for re-direction to the E-UTRAN to which the UE has attempted RRC connection. If determining that the re-direction information includes the instruction for re-direction to the E-UTRAN, the UE ignores the re-direction instruction and searches for another suitable cell for re-connection in operation 1345. If determining that the re-direction information includes the instruction for re-direction to the E-UTRAN, the UE performs a general procedure for re-direction to the E-UTRAN.

In the third embodiment of the present disclosure, if the instruction for re-direction to the E-UTRAN is ignored, a network-specific operation is not necessary, such that operations of the UTRAN, the MME, and the E-UTRAN, which are the same as those of conventional techniques, will not be described in detail.

Fourth Embodiment

The fourth embodiment of the present disclosure uses a feature in which the current frequency of an E-UTRAN having rejected RRC connection for an UE is excluded from frequency priority information of an RRC CONNECTION RELEASE message. That is, the frequency priority information of the RRC CONNECTION RELEASE message received from the E-UTRAN is incorporated into an RRC CONNECTION REQUEST message sent to a UTRAN. In this way, the current frequency of the E-UTRAN having rejected RRC connection is excluded from the frequency priority information, such that the UTRAN is prevented from instructing the UE to be re-directed to the E-UTRAN.

Figure 14:
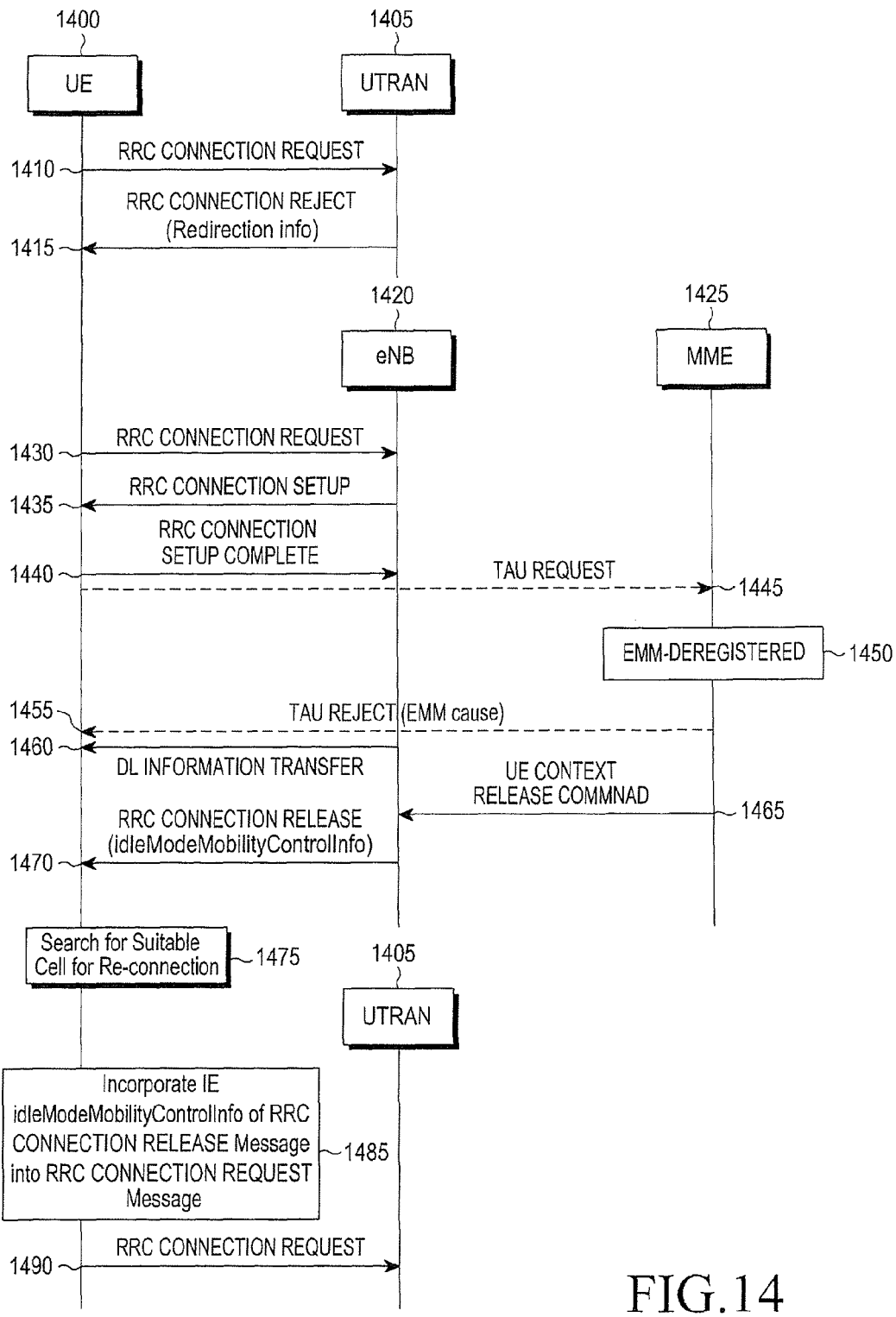
FIG. 14 is a flowchart illustrating operations according to a fourth embodiment of the present disclosure.

FIG. 14 is a flowchart illustrating operations according to the fourth embodiment of the present disclosure.

Referring to FIG. 14, operations 1410 and 1415 are the same as operations 210 and 215 of FIG. 2, and thus will not be described in detail. Likewise, operations 1430 through 1470 correspond to the description made with reference to FIG. 3, and thus will not be described in detail. For example, MME 1425 of FIG. 14 can be the same as or similar to MME 310 of FIG. 3. Then, in operation 1475, a UE 1400, RRC connection of which has been rejected by an E-UTRAN 1420, searches for a UTRAN as a suitable cell for re-connection. Herein, for convenience, it is described as an example that the found UTRAN is the same as the UTRAN having rejected RRC connection, but the found UTRAN may not be the same as the rejecting UTRAN.

In operation 1485, the UE incorporates frequency priority information IE idleModeMobilityControlInfo of the RRC CONNECTION RELEASE message received from the E-UTRAN 1420 into an RRC CONNECTION REQUEST message. The frequency priority information IE idleModeMobilityControlInfo does not include the current frequency of the E-UTRAN.

The UE sends the RRC CONNECTION REQUEST message including the frequency priority information IE idleModeMobilityControlInfo to the UTRAN 1405, in operation 1490.

Figure 15:
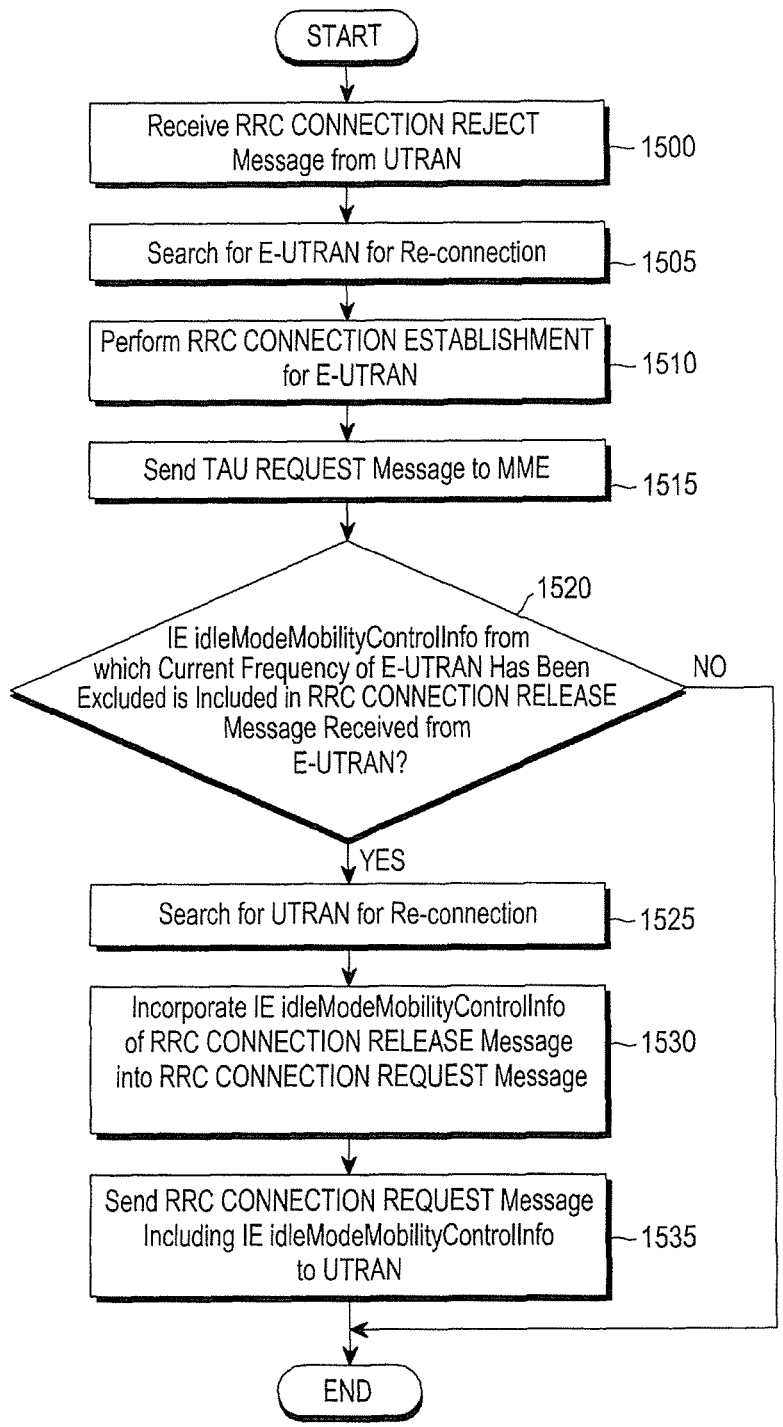
FIG. 15 is a flowchart illustrating operations of a UE according to a fourth embodiment of the present disclosure.

FIG. 15 is a flowchart illustrating operations of a UE according to the fourth embodiment of the present disclosure.

Referring to FIG. 15, in operation 1500, the UE receives an RRC CONNECTION REJECT message from a UTRAN. In operation 1505, the UE searches for a suitable cell for re-connection, that is, an E-UTRAN, by using re-direction information included in the RRC CONNECTION REJECT message. In operation 1510, the UE performs RRC CONNECTION ESTABLISHMENT with respect to the E-UTRAN. In operation 1515, the UE delivers a TAU REQUEST message to an MME. Thereafter, as shown in FIG. 14, it is assumed that the MME enters an EMM-DEREGISTERED state, such that RRC connection requested by the UE has been rejected by the E-UTRAN and the UE has received an RRC CONNECTION RELEASE message. Then, in operation 1520, the UE determines whether the RRC CONNECTION RELEASE message received from the E-UTRAN includes frequency priority information IE idleModeMobilityControlInfo from which the current frequency of the E-UTRAN is excluded. If determining that the frequency priority information IE idleModeMobilityControlInfo is included, the UE searches for a suitable cell for re-connection, that is, a UTRAN, in operation 1525. In operation 1530, the UE incorporates the frequency priority information IE idleModeMobilityControlInfo of the RRC CONNECTION RELEASE message into an RRC CONNECTION REQUEST message. In operation 1535, the UE sends the RRC CONNECTION REQUEST message including the frequency priority information IE idleModeMobilityControlInfo to the UTRAN.

Figure 16:
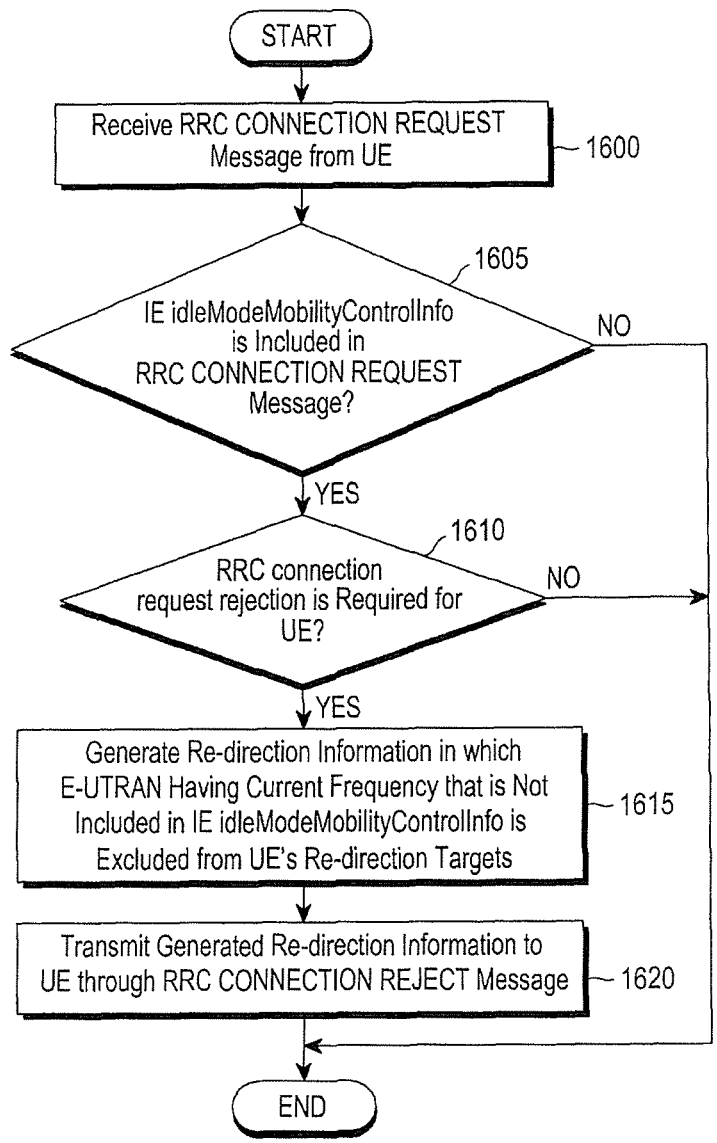
FIG. 16 is a block diagram illustrating operations of a UTRAN according to a fourth embodiment of the present disclosure.

FIG. 16 is a flowchart illustrating operations of a UTRAN according to the fourth embodiment of the present disclosure.

Referring to FIG. 16, in operation 1600, the UTRAN receives an RRC CONNECTION REQUEST message from a UE. In operation 1605, the UTRAN determines whether frequency priority information IE idleModeMobilityControlInfo is included in the RRC CONNECTION REQUEST message. If determining that the frequency priority information IE idleModeMobilityControlInfo is included, in operation 1610, the UTRAN determines whether RRC connection request rejection is required for the UE according to a predetermined condition. This condition may include a case where the UE is a roaming UE. The condition is not closely related to a scheme proposed in the present disclosure and thus will not be described in detail.

If determining that RRC connection request rejection is required for the UE, the UTRAN generates re-direction information in which the E-UTRAN having the current frequency that is not included in the frequency priority information idleModeMobilityControlInfo is excluded from re-direction targets of the UE in operation 1615. In operation 1620, the UTRAN transmits the re-direction information to the UE through an RRC CONNECTION REJECT message.

Flows of operations of the MME and the E-UTRAN according to the fourth embodiment of the present disclosure are the same as those of FIGS. 7 and 8, and thus will not be described in detail.

Fifth Embodiment

The second embodiment of the present disclosure has proposed a method for implicitly instructing the UTRAN not to perform an RRC connection rejection procedure including an instruction for re-direction to the E-UTRAN. More specifically, IEs included in conventional Pre-redirection info, that is, both 'IE Support of E-UTRA FDD' and 'Support of E-UTRA TDD' are set to 'False' and an RRC CONNECTION REQUEST message that includes all of or none of the IEs set to 'False' is sent to a base station of the UTRAN. The second embodiment of the present disclosure has proposed considering an EMM cause value received from an MME in an E-UTRAN network or using frequency priority information IE idleModeMobilityControlInfo of the RRC CONNECTION RELEASE message when the UE configures Pre-redirection info of the RRC CONNECTION REQUEST message. The fifth embodiment of the present disclosure proposes a method for the UE to configure Pre-redirection info of the RRC CONNECTION REQUEST message, taking another condition into account.

More specifically, when an RNC of the UTRAN instructs re-direction without recognizing whether the UE may be registered in the E-UTRAN, a ping-pong phenomenon of re-direction between the E-UTRAN and the UTRAN occurs. That is, the UE re-directed to the E-UTRAN fails to be registered in the E-UTRAN and thus goes back to the UTRAN. However, the UTRAN may re-direct the UE to the E-UTRAN, such that the ping-pong phenomenon occurs. Generally, when the UTRAN and the E-UTRAN are managed by different operators, the network may not know whether the UE may be registered therein. In other words, when the UTRAN and the E-UTRAN are managed by different operators, the UTRAN and the E-UTRAN have different Public Land Mobile Networks (PLMNs). On the other hand, if the UTRAN and the E-UTRAN are managed by the same operator, the UTRAN and the E-UTRAN may be indicated by the same PLMN, or even when the UTRAN and the E-UTRAN are indicated by different PLMNs, a PLMN of a counterpart network may be indicated using an Equivalent PLMN (ePLMN) list. Thus, as mentioned above, the UE undergoing the ping-pong phenomenon in the UTRAN and the E-UTRAN sets both 'IE Support of E-UTRA FDD' and 'Support of E-UTRA TDD' to 'False' in Pre-direction info, for an E-UTRAN network which has not succeeded in registration and has a PLMN that is not included in the ePLMN list, thereby preventing the UE from being re-directed to the E-UTRAN network.

Figure 17:
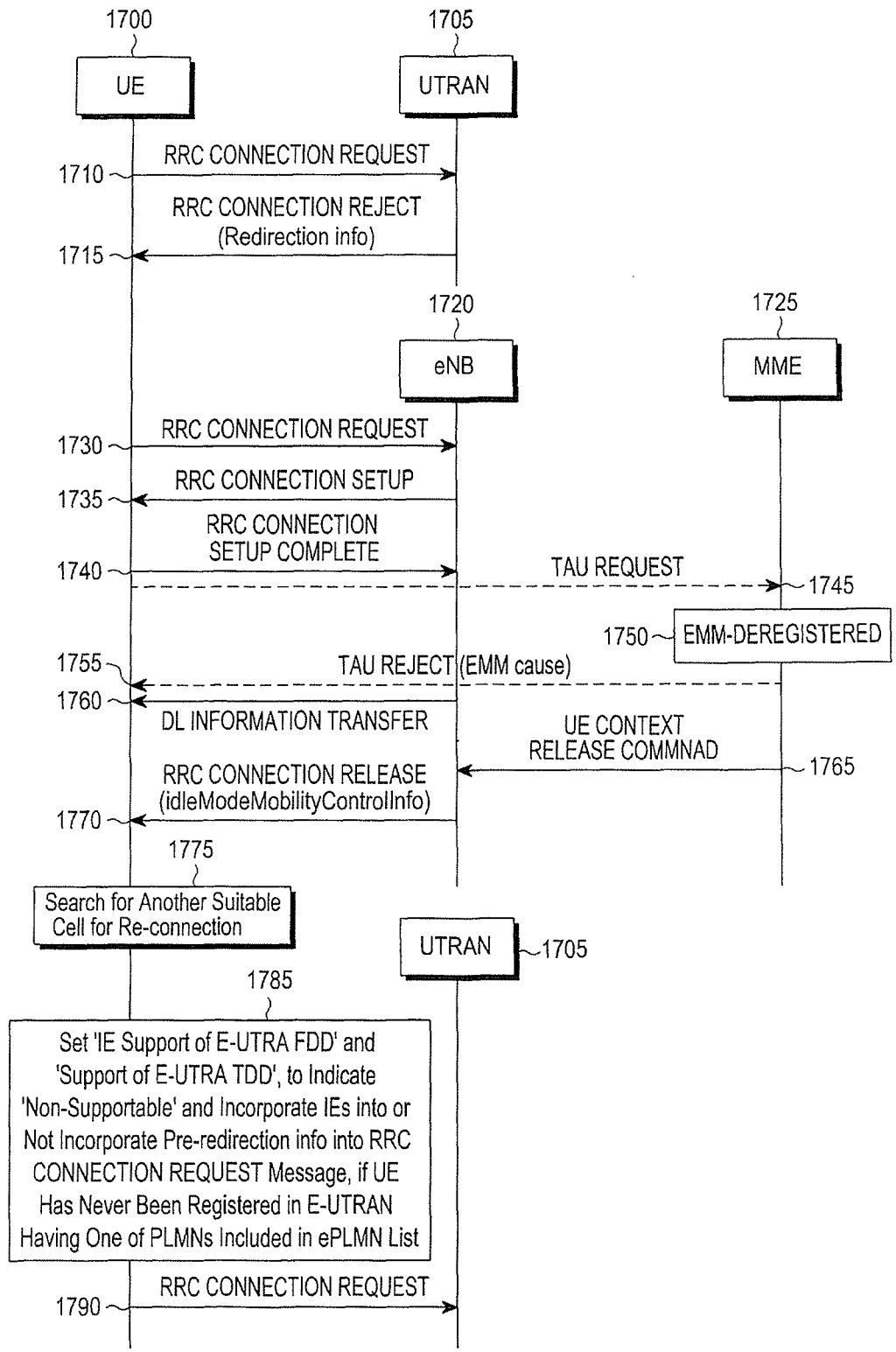
FIG. 17 is a flowchart illustrating operations according to a fourth embodiment of the present disclosure.

FIG. 17 is a flowchart illustrating operations according to the fifth embodiment of the present disclosure.

Referring to FIG. 17, operations 1710 and 1715 are the same as operations 210 and 215 of FIG. 2 and thus will not be described in detail. Operations 1730 and 1770 are the same as conventional operations, and thus will not be described in detail. For example, E-UTRAN 1720 of FIG. 17 can be the same as or similar to E-UTRAN 305 of FIG. 3. Thus, in the specification, only a portion changed according to the fifth embodiment of the present disclosure will be described.

As stated before, if the UTRAN and the E-UTRAN are managed by different operators, the ping-pong phenomenon occurs in re-direction. In this case, a UE 1700 may not be registered in the E-UTRAN network. Thus, in operation 1755, the UE 1700 receives a TAU REJECT message from an MME 1725. For this reason, the UE 1700 has never been registered in the E-UTRAN. In operation 1775, the UE 1700, an RRC connection request of which has been rejected by the E-UTRAN, searches for an UTRAN as a suitable cell for re-connection. In operation 1785, if the UE 1700 has never been registered in the E-UTRAN having one of PLMNs included in its ePLMN list, the UE 1700 indicates values of the IEs of Pre-redirection info, that is, both 'IE Support of E-UTRA FDD' and 'Support of E-UTRA TDD' as non-supportable ('False'). The UE 1700 incorporates all of or none of the IEs into an RRC CONNECTION REJECT message. In operation 1790, the UE 1700 sends an RRC CONNECTION REQUEST message including all of the IEs or not including Pre-redirection info to a UTRAN 1705.

Figure 18:
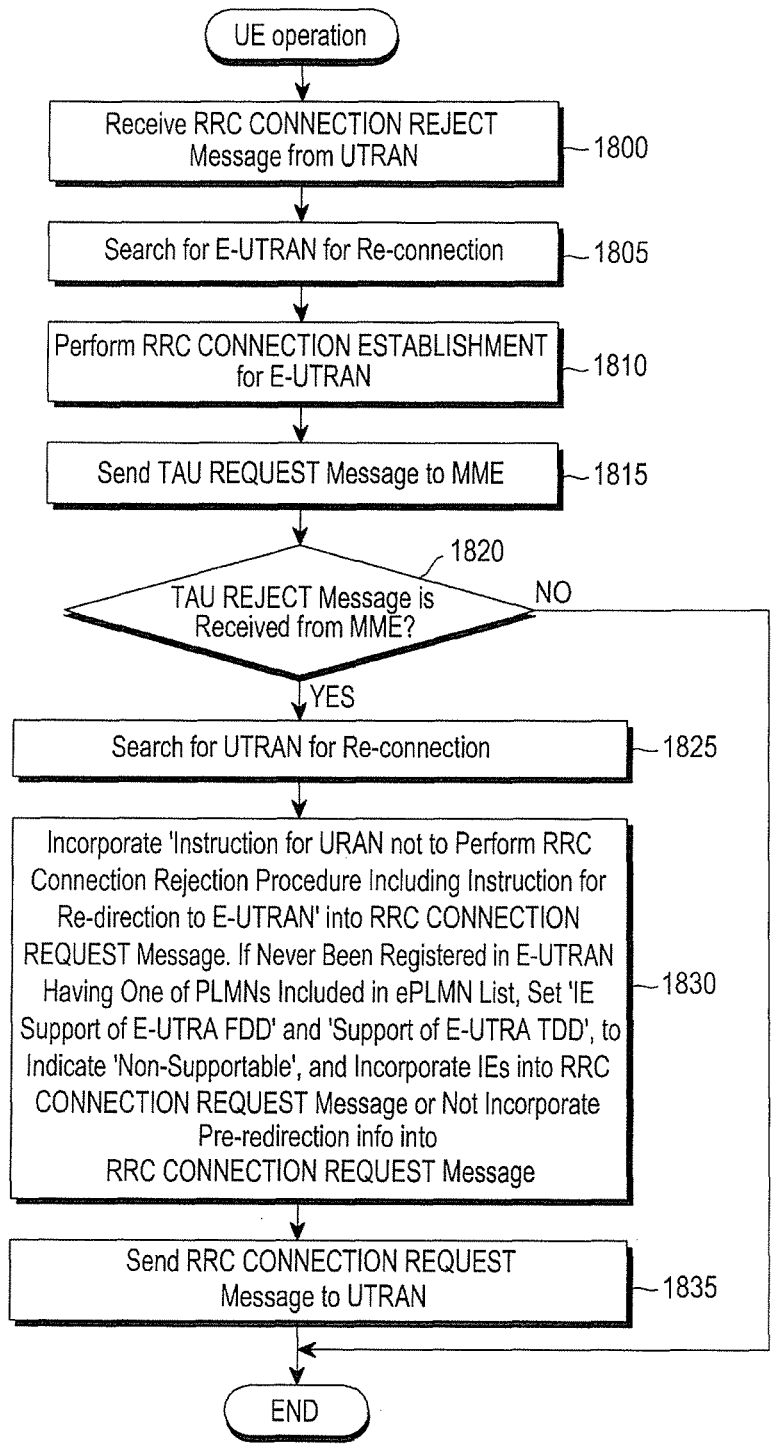
FIG. 18 is a flowchart illustrating operations of a UE according to a fourth embodiment of the present disclosure.

FIG. 18 is a flowchart illustrating operations of a UE according to the fifth embodiment of the present disclosure.

Referring to FIG. 18, in operation 1800, the UE receives an RRC CONNECTION REJECT message from a UTRAN. In operation 1805, the UE searches for a suitable cell for re-connection, that is, an E-UTRAN, by using re-direction information included in the RRC CONNECTION REJECT message. In operation 1810, the UE performs RRC CONNECTION ESTABLISHMENT with respect to the E-UTRAN. In operation 1815, the UE delivers a TAU REQUEST message to an MME. In operation 1820, the UE determines whether a TAU REJECT message is received from the MME. If the UE does not receive the TAU REJECT message, the UE regards itself as successfully registered in the E-UTRAN network and terminates the operations of FIG. 20. However, if receiving the TAU REJECT message, the UE searches for a UTRAN for re-connection in operation 1825. In operation 1830, the UE sets an 'instruction for the UTRAN not to perform the RRC connection rejection procedure including the instruction for re-direction to the E-UTRAN' in the RRC CONNECTION REQUEST message. More specifically, the UE sets the values of the IEs of Pre-redirection info, that is, 'IE Support of E-UTRA FDD' and 'Support of E-UTRA TDD' to indicate non-supportable, or does not incorporate Pre-redirection info into an RRC CONNECTION REQUEST message, if the UE has never been registered in the E-UTRAN network having one of PLMNs included in its ePLMN list. In operation 1835, the UE sends the RRC CONNECTION REQUEST message including the IEs or none of the IEs to the UTRAN.

Sixth Embodiment

At present, a roaming agreement of a UE is made as possible/impossible for a data service or possible/impossible for a voice service. Thus, in a home network, a UE having used a data service determines whether to roam for data in a roaming network. Assuming LTE as a new system, a roaming agreement that is available in a home network, but is not available in a roaming network may be made.

Figure 19:
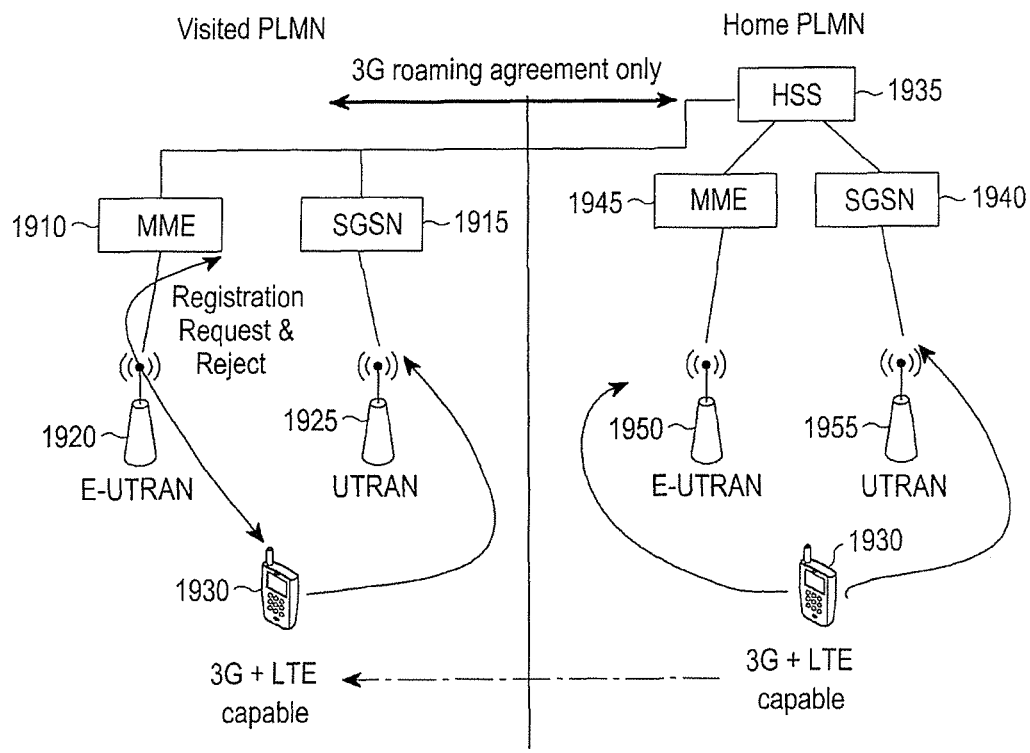
FIG. 19 is a diagram for describing a problem to be solved in a sixth embodiment of the present disclosure.

FIG. 19 is a diagram for describing a problem to be solved in the sixth embodiment of the present disclosure.

Figure 21:
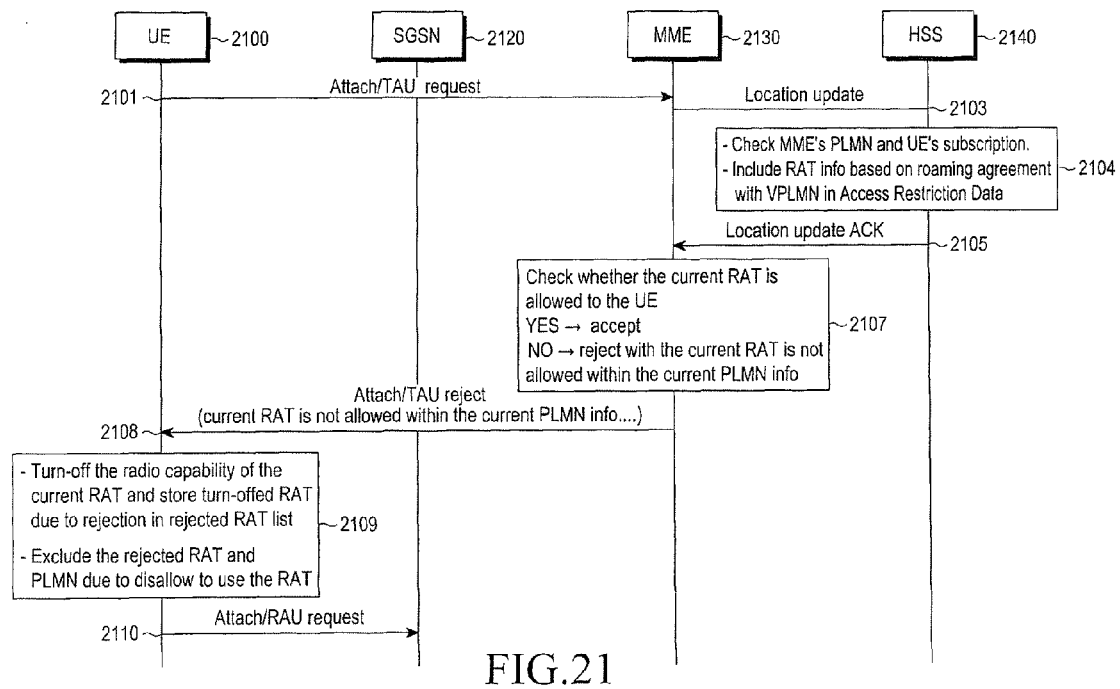
FIG. 21 is a diagram for describing a method of delivering RAT processing information that is not allowed in an MME/SGSN to a UE in a sixth embodiment of the present disclosure.

Referring to FIG. 19, in a Home PLMN having both an E-UTRAN 1950 and a UTRAN 1955, a UE 1930 capable of supporting both an E-UTRAN and a GSM-EDGE Radio Access Network (GERAN)/UTRAN may use both radio access technologies, such that the UE 1930 is allowed to be registered in a control entity, an MME 1945 to use the E-UTRAN 1950 and in a control entity, an SGSN 1940 to use the UTRAN 1955. The MME 1945 and the SGSN 1940 can be communicatively linked to the HSS 1935. However, when the UE 1930 moves to a visited PLMN by changing a PLMN and thus enters a roaming state, a roaming agreement is made for some RATs between a home network and a visited network, such that a part of the radio access technology used in the home network may not be available. In FIG. 21, the roaming agreement is made only for 3G, such that the UE 1930 may use the UTRAN 1925 in the visited PLMN without any problem, but when the UE 1930 uses the E-UTRAN 1920, a network registration request including TAU or attach request may be rejected by the MME 1910 that is the control entity in the visited PLMN.

The rejected UE 1930 may move to the UTRAN 1925 in the roaming network to be registered in the control entity of the UTRAN, the SGSN 1915 and to use the network, and may perform Handover/Redirection/Cell (re-)selection/fast-redirection to the E-UTRAN. This is because priority adjustment has been made such that the UE preferentially uses the E-UTRAN in the home PLMN, and thus the UE preferentially selects the E-UTRAN in the idle state, and because there is no information regarding some RAT restriction indicating that the UE cannot use the E-UTRAN in the UTRAN base station 1915 of the roaming network.

As such, if the UE performs Handover/Redirection/Cell (re-)selection to an RAT which is disallowed for roaming, network use registration in the RAT is rejected, and the UE moves to a roaming-allowed RAT and performs again Handover/Redirection/Cell (re-)selection to a roaming-disallowed RAT and the network use registration is rejected again. Such a phenomenon may be prevented by the present disclosure.

The sixth embodiment of the present disclosure proposes a method for using a PLMN-specific allowed RAT list and a method for delivering RAT processing information regarding disallowed RATs in an MME to a UE.

Figure 20:
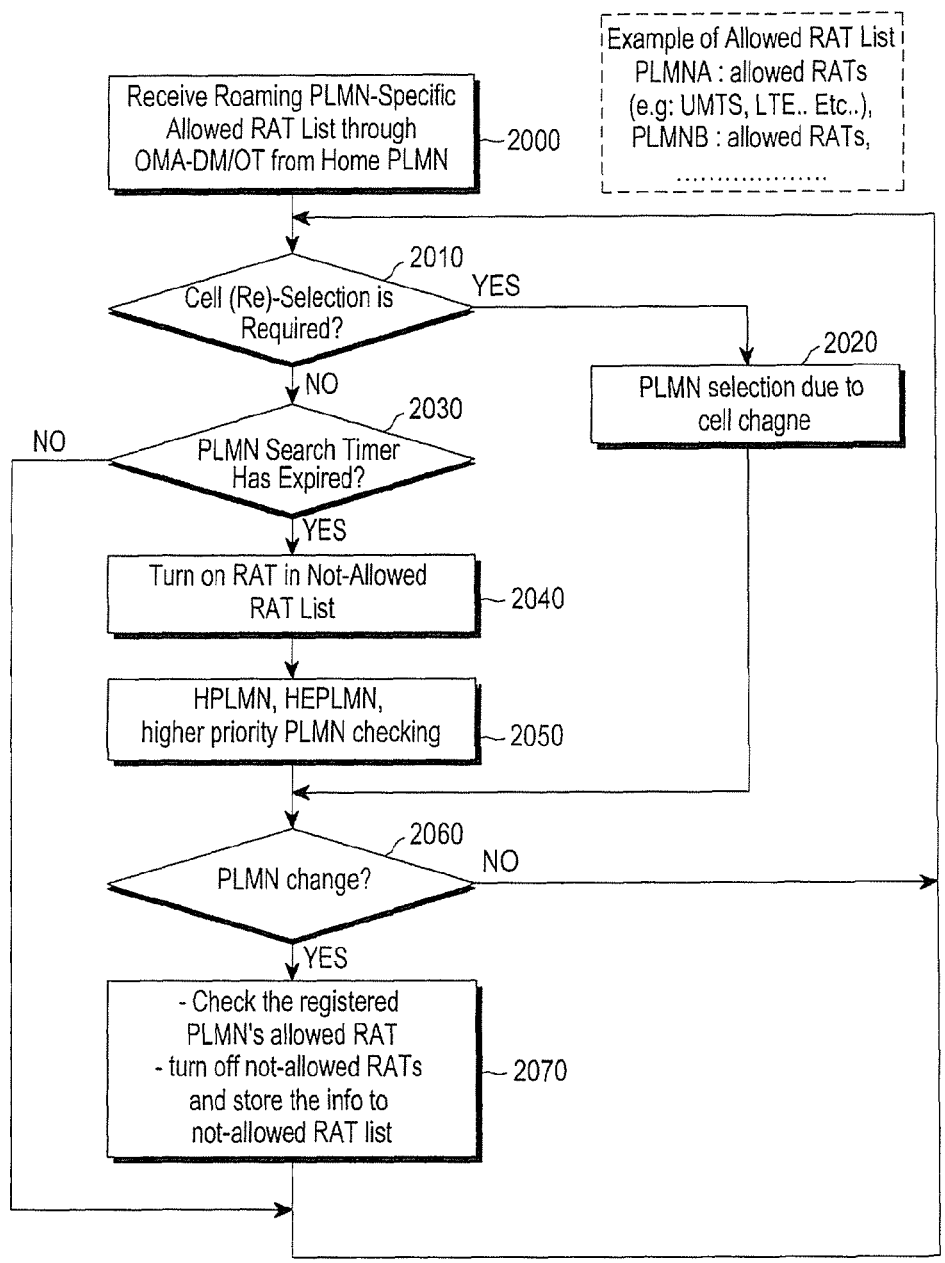
FIG. 20 is a diagram for describing a process of using set information for a PLMN-specific allowed RAT in a sixth embodiment of the present disclosure.

FIG. 20 is a diagram for describing a process of using set information for a PLMN-specific allowed RAT in the sixth embodiment of the present disclosure.

Referring to FIG. 20, in operation 2000, a Home PLMN transmits a list of RATs allowed in a roaming network according to a roaming agreement to a UE with OMA-DM. The list includes a PLMN id of a PLMN having the roaming agreement and information of RATs allowed in the PLMN. Examples of the PLMN id and the information may be provided in the form of a list as below.

PLMN-A: allowed RATs (e.g: UMTS, LTE . . . Etc. . . . ),
PLMN-B: allowed RATs,

In operation 2010, the UE determines whether cell selection/resection is required according to a propagation state. In operation 2030, based on the determination, when the UE does not perform cell selection/resection and current network use is registered, the UE periodically operates a timer T for finding a HPLMN, an EHPLMN, and a higher priority PLMN. If the T timer has not expired, the UE terminates its operation. If the T timer has expired, in operation 2040, the UE turns on an RAT that is turned off because of being disallowed in the PLMN of the currently registered network, and performs cell selection/reselection and PLMN selection in operation 2050. In operation 2060, the UE determines whether a HPLMN, an EHPLMN, and a higher priority PLMN that are different from the currently registered PLMN are selected as a result of cell selection/reselection and PLMN selection. If the selected HPLMN, EHPLMN, and higher priority PLMN are different from the currently registered PLMN, the UE goes back to operation 2010. If different HPLMN, EHPLMN, and higher priority PLMN are selected, the UE checks a list of RATs allowed in the roaming network to check RATs allowed in the newly selected PLMN in operation 2070. If there are disallowed RATs including the current camping RAT in the newly selected PLMN, this information is incorporated into a list of RATs that are turned off because of being disallowed, and the RATs included in the list all are turned off. If cell selection is necessary based on the turn-off result, the UE performs operation 2010 and its subsequent operations again. If a PLMN is changed in operation 2020 after operation 2010, the UE performs operation 2060 and its subsequent operations again.

FIG. 21 is a ladder diagram for describing a method for delivering RAT processing information regarding RATs that are disallowed in an MME/SGSN to a UE.

To solve a problem in FIG. 21, when a response to an attach request or a TAU request for UE's registration in a network in a roaming network is sent, information indicating that the current camping RAT is not available and thus the RAT needs to be turned off is delivered to the UE through the response.

In operation 2010, in the roaming network, a UE 2100 sends an Attach/TAU request to a network control entity, an MME 2130 to register network use. In operation 2103, the MME 2130 having received the request from the UE 2100 sends a location update request to an HSS 2140 to register the current location of the UE and obtain subscription information. In operation 2105, the HSS 2140 checks a PLMN of the MME 2130 and the subscription of the UE 2100 and delivers access authority information of the UE with respect to RATs through subscription information to be provided to the MME 2130. Instead of performing operations 2103, 2104, and 2105, in operation 2107, the MME 2130 may obtain a HOME PLMN of the UE by using IMSI included in context information of the UE to determine whether the radio access technology currently used by the UE is allowed to the UE based on information that is set in the MME 2130 regarding whether the use of the RAT (the E-UTRAN if checking is made in the MME 2130) currently used between the PLMN of the MME 2130 and the Home PLMN of the UE is allowed or disallowed to the UE.

In operation 2108, based on information regarding a radio access technology available to the UE, provided from the HSS 2140, or set information of the Home PLMN and the MME, included in the IMSI of the UE, the MME 2130 determines whether the radio access technology currently used in the UE is allowed. If the radio access technology is allowed, the MME 2130 accepts an Attach/TAU request sent from the UE 2100 in operation 2101. If the radio access technology is disallowed, the MME 2130 rejects the Attach/TAU request sent from the UE 2100 and delivers information indicating that the use of the currently used radio access technology is disallowed to the UE 2100 together with an Attach/TAU reject message in operation 2101.

In operation 2108, the UE 2100 having received the information indicating that the use of the radio access technology is not allowed through the message turns off the currently used radio access technology, and stores information about the PLMN and the RAT for which registration has been attempted in a PLMN-specific unavailable RAT list or an RAT-specific unavailable PLMN list in operation 2109. The RAT of the PLMN for which the information is stored is excluded from PLMN and RAT selection. In operation 2110, the UE 2100 attempts network use registration for an RAT that is not turned off. That is, the UE 2100 sends an Attach/Routing Area Update (RAU) request to the SGSN 2120.

Although not shown, the UE may turn on the turned-off RAT in the following cases:
 When PLMN change occurs
 When a USIM of the UE is removed and then inserted
 When the UE is powered off and then powered on
 When a timer for searching for a HPLMN, a HEPLMN, and a high priority PLMN has expired As another example of operations of the UE having received the Attach/TAU reject message from the MME 2130 in operation 2108, the UE 2100 having received the information indicating that the use of the radio access technology is disallowed through the Attach/TAU reject message in operation 2108 adds PLMN information of the MME 2130 selected when the UE 2100 sends a tracking area/service request to the MME 2130 to a list of PLMNs, access to which is forbidden when the radio access technology is used. For the PLMN, access to which is forbidden when the radio access technology is used, an Attach/TAU/service request is not sent. For example, in case of an E-UTRAN, PLMN information corresponding to transmission of the information indicating that the use of the radio access technology is disallowed is stored in the forbidden PLMN list for the E-UTRAN, and thereafter, when the E-UTRAN is used, PLMNs included in the forbidden PLMN list for the E-UTRAN are not selected when the network is used, and the UE does not send the request to those PLMNs. After updating the list of PLMNs, access to which is forbidden when the radio access technology is used, the UE may select another PLMN capable of using the radio technology or select another radio technology of the rejected PLMN. For example, if receiving information indicating that the use of the E-UTRAN is not allowed due to a PLMN A through a TAU REJECT message, the UE may attempt registration by an operation of sending an Attach request to a UTRAN/GERAN that is another RAT of the PLMN A or by an operation of sending an Attach request to an E-UTRAN of a PLMN B that is different from the PLMN A. A determination of which one of the operations is to be performed may be made based on a priority list of RATs and PLMNs which is set in the UE. The list of PLMNs, access to which is forbidden when the radio access technology is used, is reset and initialized in the following cases:
 When the USIM of the UE is removed and then inserted
 When the UE is powered off and then powered on FIG. 22 is a block diagram of a UE to which embodiments of the present disclosure are applied.

Figure 22:
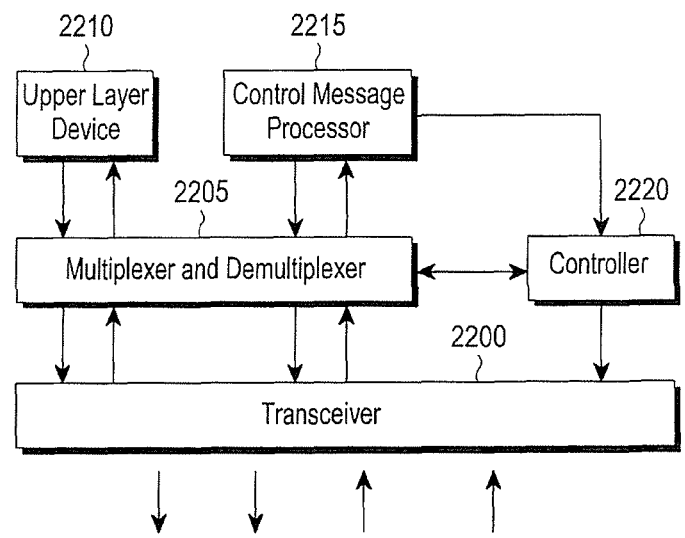
FIG. 22 is a block diagram of a UE to which embodiments of the present disclosure are applied.

Referring to FIG. 22, the UE may include a transceiver 2200, a multiplexer and demultiplexer 2205, an upper layer device 2210, a control message processor 2215, and a controller 2220.

The UE transmits and receives data to and from the upper layer device 2210, and transmits and receives control messages through the control message processor 2215. When transmitting a control signal or data to a base station, the UE transmits data through the transceiver 2200 after multiplexing the data through the multiplexer and demultiplexer 2205 under control of the controller 2220. The UE receives a physical signal through the transceiver 2200 under control of the controller 2220, demultiplexes the received signal through the multiplexer and demultiplexer 2205, and delivers the signal to the upper layer device 2210 or the control message processor 2215 based on message information.

In particular, the control message processor 2215 sets an indicator for preventing the UE from unnecessarily re-connecting to a system, an RRC connection request to which has been rejected, according to the first through fourth embodiments of the present disclosure, and transmits the indicator to the base station through a corresponding message. The indicator has already been described in detail in the respective embodiments, and thus will not be described at this time.

Figure 23:
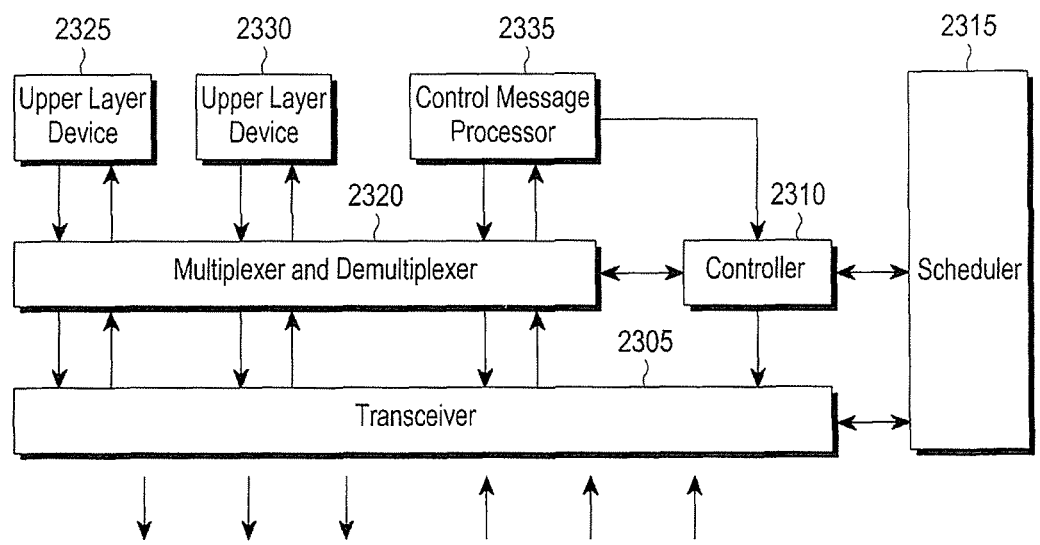
FIG. 23 is a block diagram of a base station according to an embodiment of the present disclosure.

FIG. 23 is a block diagram of a base station according to an embodiment of the present disclosure. Herein, the base station may operate as a UTRAN or an E-UTRAN mentioned in relation to FIGS. 1 through 22.

Referring to FIG. 23, the base station may include a transceiver 2305, a controller 2310, a scheduler 2315, a multiplexer and demultiplexer 2320, a control message processor 2335, and upper layer processors 2325 and 2330.

The transceiver 2305 transmits data and a predetermined control signal through forward carriers and receives data and a predetermined control signal through backward carriers. If multiple carriers are set, the transceiver 2305 performs data transmission and reception and control signal transmission and reception using the multiple carriers.

The multiplexer and the demultiplexer 2320 multiplexes data generated in the upper layer processors 2325 and 2330 or in the control message processor 2335 or demultiplexes data received from the transceiver 2305 to deliver the multiplexed or demultipelxed data to the upper layer processors 2325 and 2330, the control message processor 2335, or the controller 2310. The control message processor 2335 processes a control message sent from the UE to perform necessary operations or generates a control message to be sent to the UE and delivers the generated control message to a lower layer.

Each of the upper layer processors 2325 and 2330 may be configured for each UE or each service, and processes data generated in a user service such as a File Transfer Protocol (FTP) or a Voice over Internet Protocol (VoIP) to deliver the data to the multiplexer and demultiplexer 2320 or processes data delivered from the multiplexer and demultiplexer 2320 to deliver the processed data to an upper-layer service application.

The controller 2310 determines when the UE is to transmit data to control the transceiver 2305.

The scheduler 2315 allocates a transmission resource to the UE at a proper point in time, taking a buffer state of the UE, a channel state, and an active time of the UE into account, and controls the transceiver to process a signal transmitted from the UE or to transmit a signal to the UE.

In particular, the control message processor 2335 receives a message including an indicator an indicator for preventing the UE from unnecessarily re-connecting to a system, an RRC connection request to which has been rejected, according to the first through fourth embodiments of the present disclosure, and stops the UE's unnecessary re-connection based on an instruction of the indicator. Likewise, the indicator has already been described in detail in the respective embodiments, and thus will not be described at this time.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

The invention claimed is:

1. A method by a terminal, the method comprising:
if the terminal enters a target public land mobile network (PLMN), transmitting a tracking area update request message to a mobile management entity (MME);
receiving a response message for the tracking area update request message from the MME;
determining whether the response message includes information indicating that using a radio access technology (RAT) is not allowed in the target PLMN;
disabling a capability to use the RAT if the response message includes the information; and
if a PLMN selection is required, enabling the disabled capability to use the RAT.

2. The method of claim 1, further comprising:
storing identification information of the target PLMN where the capability to use the RAT is disabled.

3. The method of claim 1, further comprising:
after disabling the capability to use the RAT, if the terminal powers off and powers on again, or a subscriber identity module of the terminal is removed, enabling the disabled capability to use the RAT again.

4. The method of claim 1, further comprising:
transmitting, to the MME, an attach request message; and
if an attach reject message received in response to the attach request message includes the information, disabling the capability to use the RAT.

5. The method of claim 2, further comprising:
selecting another RAT in the target PLMN,
wherein the RAT is an evolved universal terrestrial radio access network (E-UTRAN).

6. A terminal, the terminal comprising:
a transceiver configured to, if the terminal enters a target public land mobile network (PLMN), transmit a tracking area update request message to a mobile management entity (MME), and receive a response message for the tracking area update request message from the MME; and
a controller configured to determine whether the response message includes information indicating that using a radio access technology (RAT) is not allowed in the target PLMN, disable a capability to use the RAT if the response message includes the information, and if a PLMN selection is required, enable the disabled capability to use the RAT.

7. The terminal of claim 6, further comprising:
a memory configured to store identification information of the target PLMN where the capability to use the RAT is disabled.

8. The terminal of claim 6, wherein the controller is further configured to select another RAT in the target PLMN,
wherein the RAT is an evolved universal terrestrial radio access network (E-UTRAN).

9. The terminal of claim 6, further comprising:
after disabling the capability to use the RAT, if the terminal powers off and powers on again, or a subscriber identity module of the terminal is removed, the controller is further configured to enable the disabled capability to use the RAT.

10. The terminal of claim 6, wherein the transceiver is further configured to transmit, to the MME, an attach request message, and
if an attach reject message received in response to the attach request message includes the information, disabling the capability to use the RAT.

* * * * *